(12) United States Patent
Neihouser et al.

(10) Patent No.: US 12,350,212 B2
(45) Date of Patent: Jul. 8, 2025

(54) PATIENT TRANSPORT APPARATUS WITH ELECTRO-MECHANICAL BRAKING INPUT HOLD CIRCUIT

(71) Applicant: Stryker Corporation, Kalamazoo, MI (US)

(72) Inventors: Kirby M. Neihouser, Francesville, IN (US); Lavanya Vytla, McKinney, TX (US); Charles Donald Baker, Jr., Portage, MI (US); Krishna Sandeep Bhimavarapu, Kalamazoo, MI (US); Nicholas Alexander, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 429 days.

(21) Appl. No.: 17/825,536

(22) Filed: May 26, 2022

(65) Prior Publication Data

US 2022/0378635 A1    Dec. 1, 2022

Related U.S. Application Data

(60) Provisional application No. 63/194,236, filed on May 28, 2021.

(51) Int. Cl.
*A61G 7/05*      (2006.01)
*B60B 33/00*   (2006.01)

(52) U.S. Cl.
CPC ........ *A61G 7/0528* (2016.11); *B60B 33/0092* (2013.01); *A61G 2203/36* (2013.01); *A61G 2203/44* (2013.01)

(58) Field of Classification Search
CPC .............. A61G 7/0528; A61G 2203/36; A61G 2203/44; A61G 2203/16; A61G 7/018;
(Continued)

(56) References Cited

U.S. PATENT DOCUMENTS 8,024,101 B2   9/2011   Froli
8,789,662 B2   7/2014   Childs et al.
(Continued)

FOREIGN PATENT DOCUMENTS

WO   2021108377 A1   6/2021
WO   2021242946 A1   12/2021

*Primary Examiner* — Madison Emanski
(74) *Attorney, Agent, or Firm* — Howard & Howard Attorneys PLLC

(57) ABSTRACT

A patient transport apparatus includes a base, a patient support deck, a plurality of wheels, a plurality of brakes, and an electro-mechanical braking system. The electro-mechanical braking system includes a linkage and an electrical braking assembly. The linkage is operatively coupled to the brakes to place the brakes in a braked state, a released state, or other state. The electrical braking assembly includes an actuator assembly that moves the linkage via a driving member. A user interface includes an input control for user (Continued)

engagement. A brake control circuit includes a hold circuit to generate an enable signal with a predetermined voltage in response to the user engagement with the input control, maintain the enable signal for a predetermined period following user disengagement with the input control, and operate the actuator assembly with the enable signal to move the driving member within the predetermined period.

20 Claims, 40 Drawing Sheets

(58) Field of Classification Search
CPC ........ A61G 7/012; A61G 7/08; A61G 1/0287; A61G 2203/32; A61G 7/015; A61G 7/0506; A61G 1/0237; A61G 2203/42; A61G 1/0268; A61G 2203/40; A61G 7/005; A61G 7/0524; A61G 2203/20; A61G 7/05; A61G 1/0243; A61G 1/0275; A61G 1/0212; A61G 1/02; A61G 1/0256; A61G 1/0262; A61G 1/0218; A61G 1/025; A61G 1/0293; A61G 2203/22; A61G 5/046; A61G 5/063; B60B 33/0092; B60B 2200/242; B60B 33/0086; G16H 40/63
USPC ....... 5/600, 611, 610, 613, 618, 81.1 R, 424, 5/425, 428, 510, 619, 620, 630, 81.1 HS, 5/86.1; 118/1.12; 188/1.12
See application file for complete search history.

(56) References Cited

U.S. PATENT DOCUMENTS

| | | | |
|---|---|---|---|
| 9,539,156 | B2 | 1/2017 | Lemire et al. |
| 10,045,893 | B2 | 8/2018 | Childs et al. |
| 10,172,753 | B2 | 1/2019 | Tessmer et al. |
| 10,437,348 | B2 | 10/2019 | Hayes et al. |
| 10,617,327 | B2 | 4/2020 | Kostic et al. |
| 10,786,408 | B2 | 9/2020 | Sidhu et al. |
| 10,791,966 | B2 | 10/2020 | Becker et al. |
| 10,806,653 | B2 | 10/2020 | Upchurch et al. |
| 11,020,297 | B2 | 6/2021 | Tessmer et al. |
| 2004/0200646 | A1* | 10/2004 | Waters ................ A61G 1/0287 180/15 |
| 2012/0124744 | A1* | 5/2012 | Hornbach ............. A61G 7/16 5/613 |
| 2017/0172829 | A1 | 6/2017 | Tessmer et al. |
| 2018/0360681 | A1* | 12/2018 | Paul ..................... A61G 7/012 |
| 2019/0183703 | A1* | 6/2019 | Paul ..................... A61G 7/012 |
| 2019/0192364 | A1* | 6/2019 | Upchurch ............. A61G 7/08 |
| 2019/0201255 | A1* | 7/2019 | Paul .................... A61G 1/0287 |
| 2021/0030611 | A1 | 2/2021 | Shiery et al. |

* cited by examiner

PATIENT TRANSPORT APPARATUS WITH ELECTRO-MECHANICAL BRAKING INPUT HOLD CIRCUIT

CROSS-REFERENCE TO RELATED APPLICATIONS

The subject patent application claims priority to and all the benefits of U.S. Provisional Patent Application No. 63/194,236 filed on May 28, 2021, the disclosure of which is hereby incorporated by reference in its entirety.

BACKGROUND

Patient transport apparatuses, such as hospital beds, stretchers, cots, wheelchairs, and transport chairs facilitate care of patients in a health care setting. Conventional patient transport apparatuses include a support structure having a patient support deck upon which the patient is supported, wheels to allow the patient transport apparatus to move along the floor, and a braking system having brakes to stop movement of the patient transport apparatus.

At least some known braking systems include manual foot pedals mounted to the support structure to engage or disengage the brakes. Electrical braking systems are also known for engaging and disengaging the brakes. Often, the braking system includes a linkage having a plurality of links wherein each of the links is operatively coupled to the brakes such that movement of one link causes movement of the other links and corresponding engagement or disengagement of all the brakes. There can be challenges associated with connecting, protecting, and/or supporting the links, and/or guiding movement of the links during operation. There can also be challenges associated with connecting the linkage to manual or electric actuators, determining a current state of the braking system, and/or ensuring that the brakes are fully engaged or fully disengaged.

A patient transport apparatus with a braking system is desired that addresses one or more of the aforementioned challenges.

SUMMARY

The present disclosure provides a patient transport apparatus that includes a base, a patient support deck, a plurality of wheels, a plurality of brakes, and an electro-mechanical braking system. The electro-mechanical braking system includes a linkage and an electrical braking assembly. The linkage is operatively coupled to the brakes to place the brakes in a braked state, a released state, or other state. The electrical braking assembly includes an actuator assembly that moves the linkage via a driving member. A user interface includes an input control for user engagement. A controller is disposed in electrical communication with the electrical braking assembly and the user interface to drive the actuator assembly. A brake control circuit includes a hold circuit to generate an enable signal with a predetermined voltage in response to the user engagement with the input control, maintain the enable signal for a predetermined period following user disengagement with the input control, and operate the actuator assembly with the enable signal to move the driving member within the predetermined period.

The present disclosure further provides a patient transport apparatus that includes a base, a patient support deck, a plurality of wheels, a plurality of brakes, and an electro-mechanical braking system. The electro-mechanical braking system includes a linkage and an electrical braking assembly. The linkage is operatively coupled to the brakes to place the brakes in a braked state, a released state, or other state. The electrical braking assembly includes an actuator assembly that moves the linkage via a driving member. A user interface includes an input control for user engagement. A controller is disposed in electrical communication with the electrical braking assembly and the user interface to drive the actuator assembly. The controller is configured to generate a system status signal representing a powered function condition of the patient transport apparatus. A brake control circuit includes a hold circuit to generate an enable signal with a predetermined voltage in response to the user engagement with the input control, maintain the enable signal for a predetermined period following user disengagement with the input control, and operate the actuator assembly with the enable signal to move the driving member within the predetermined period. A redundant circuit is interposed between the controller and the electrical braking assembly. The redundant circuit engages the brake control circuit to operate the electrical braking assembly in response to simultaneously receiving the enable signal generated from the user engagement with the input control of the user interface via the hold circuit, and the system status signal generated by the controller.

DETAILED DESCRIPTION

Figure 1A:
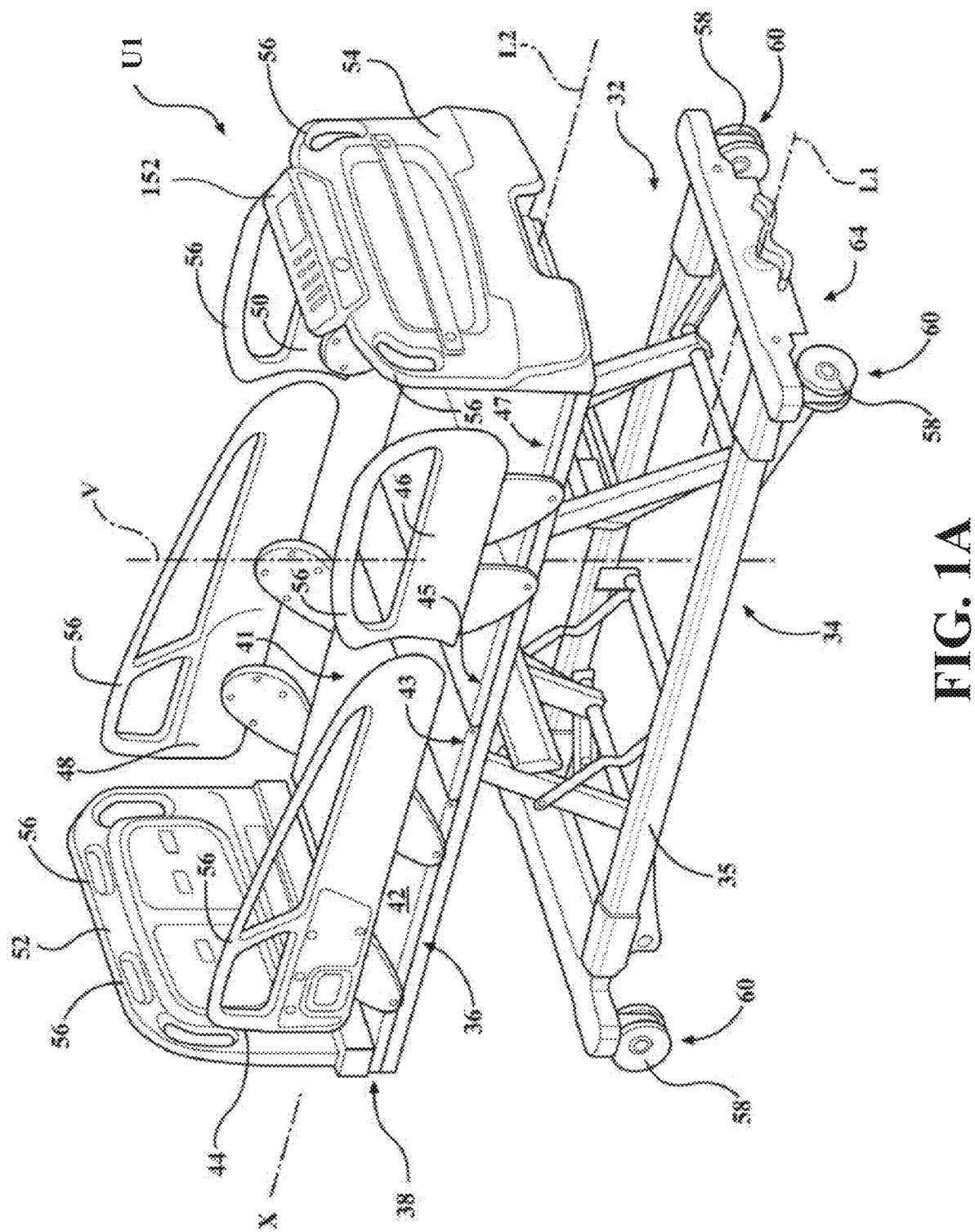
FIG. 1A is perspective view of a patient transport apparatus.

Referring to FIG. 1A, a patient transport apparatus 30 is shown for supporting a patient in a health care setting. The patient transport apparatus 30 illustrated in FIG. 1A is a hospital bed. In other versions, however, the patient transport apparatus 30 may be a stretcher, cot, wheelchair, transport chair, or similar apparatus utilized in the care of a patient.

A support structure 32 provides support for the patient. The support structure 32 illustrated in FIG. 1A includes a base 34 and a support frame 36. The base 34 includes a base frame 35. The support frame 36 is spaced above the base frame 35 in FIG. 1. The support structure 32 also includes a patient support deck 38 disposed on the support frame 36. The patient support deck 38 includes several sections, some of which are capable of articulating (e.g., pivoting) relative to the support frame 36, such as a back (fowler) section 41, a seat section 43, a leg section 45, and a foot section 47. The patient support deck 38 provides a patient support surface 42 upon which the patient is supported.

Figure 1B:
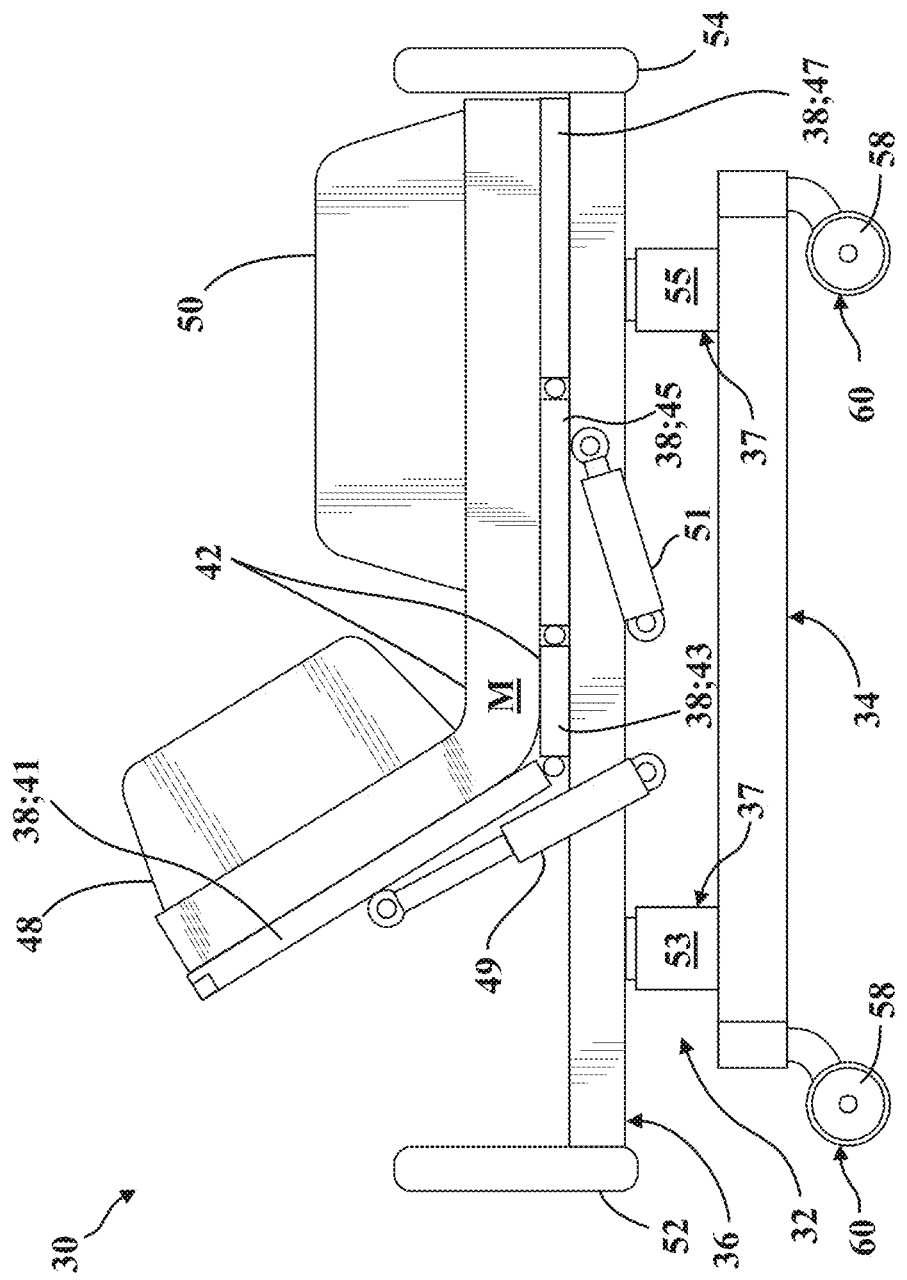
FIG. 1B is a partial, right-side schematic vice of the patient transport apparatus.

One or more deck actuators 49, 51 may be provided to move the back section 41, the leg section 45, the foot section 47, and/or other sections relative to each other and the support frame 36 (see FIG. 1B; not shown in detail). The deck actuators 49, 51 may be linear actuators, rotary actuators, or other type of actuators capable of moving the back section 41, seat section 43, leg section 45, and foot section 47. The deck actuators 49, 51 may be electrically powered, hydraulic, electro-hydraulic, and/or pneumatic, or the like. The deck actuators 49, 51 may include motors, gear trains, drive screws, nuts/lead screws, and the like, for actuation.

The patient transport apparatus 30 includes a lift mechanism 37 that operates to lift and lower the support frame 36 and the patient support deck 38 relative to the base 34. The lift mechanism 37 is configured to move the support frame 36 from a high height position to a low height position, or to any desired position in between. The lift mechanism includes a plurality of lifts and lift actuators 53, 55 to actuate the lifts (see FIG. 1B; not shown in detail). In some versions, the lift mechanism 37 may be similar to as is described in U.S. Pat. No. 10,172,753, entitled "Patient Support Lift Assembly," the disclosure of which is hereby incorporated by reference in its entirety. Other configurations are contemplated.

A mattress M (see FIG. 1B) is disposed on the patient support deck 38 during use. The mattress includes a secondary patient support surface upon which the patient is supported. The base 34, support frame 36, patient support deck 38, and patient support surfaces 42 each have a head end and a foot end corresponding to designated placement of the patient's head and feet on the patient transport apparatus 30. The base 34 includes a longitudinal axis L1 along its length from the head end to the foot end. The base 34 also includes a vertical axis V arranged crosswise (e.g., perpendicularly) to the longitudinal axis L1 along which the support frame 36 is lifted and lowered relative to the base 34. The construction of the support structure 32 may take on any known or conventional design and is not limited to that specifically set forth above. In addition, the mattress may be omitted in certain versions, such that the patient rests directly on the patient support surface 42.

Patient barriers, such as side rails 44, 46, 48, 50 are coupled to the support frame 36 and/or patient support deck 38 and are thereby supported by the base 34. A first side rail 44 is positioned at a right head end. A second side rail 46 is positioned at a right foot end. A third side rail 48 is positioned at a left head end. A fourth side rail 50 is positioned at a left foot end. In the version shown, the head end side rails 44, 48 are mounted to the back section 41 for movement with the back section 41. The foot end side rails 46, 50 are mounted to the support frame 36 for movement with the support frame 36. If the patient transport apparatus 30 is a stretcher or a cot, there may be fewer side rails. The side rails 44, 46, 48, 50 are movable relative to the back section 41/support frame 36 to a raised position in which they block ingress and egress into and out of the patient transport apparatus 30, one or more intermediate positions, and a lowered position in which they are not an obstacle to such ingress and egress. In the version shown, the side rails 44, 46, 48, 50 are connected to the back section 41 and/or the support frame 36 by pivotal support arms to form four bar linkages. Such side rails and the manner in which they may be raised/lowered are shown and described in U.S. Pat. No. 11,020,297, entitled "Powered Side Rail For A Patient Support Apparatus," hereby incorporated by reference in its entirety.

A headboard 52 and a footboard 54 are coupled to the support frame 36. The headboard 52 and footboard 54 may be coupled to any location on the patient transport apparatus 30, such as the support frame 36 or the base 34. In still other versions, the patient transport apparatus 30 does not include the headboard 52 and/or the footboard 54.

Caregiver interfaces 56, such as handles, are shown integrated into the headboard 52, footboard 54, and side rails 44, 46, 48, 50 to facilitate movement of the patient transport apparatus 30 over a floor surface. Additional caregiver interfaces 56 may be integrated into other components of the patient transport apparatus 30. The caregiver interfaces 56 are graspable by the caregiver to manipulate the patient transport apparatus 30 for movement, to move the side rails 44, 46, 48, 50, and the like.

Other forms of the caregiver interface 56 are also contemplated. The caregiver interface may include one or more handles coupled to the support frame 36. The caregiver interface may simply be a surface on the patient transport apparatus 30 upon which the caregiver logically applies force to cause movement of the patient transport apparatus 30 in one or more directions, also referred to as a push location. This may include one or more surfaces on the support frame 36 or base 34. This could also include one or more surfaces on or adjacent to the headboard 52, footboard 54, and/or side rails 44, 46, 48, 50. In other versions, the caregiver interface may include separate handles for each hand of the caregiver. For example, the caregiver interface may include two handles.

Figure 5A:
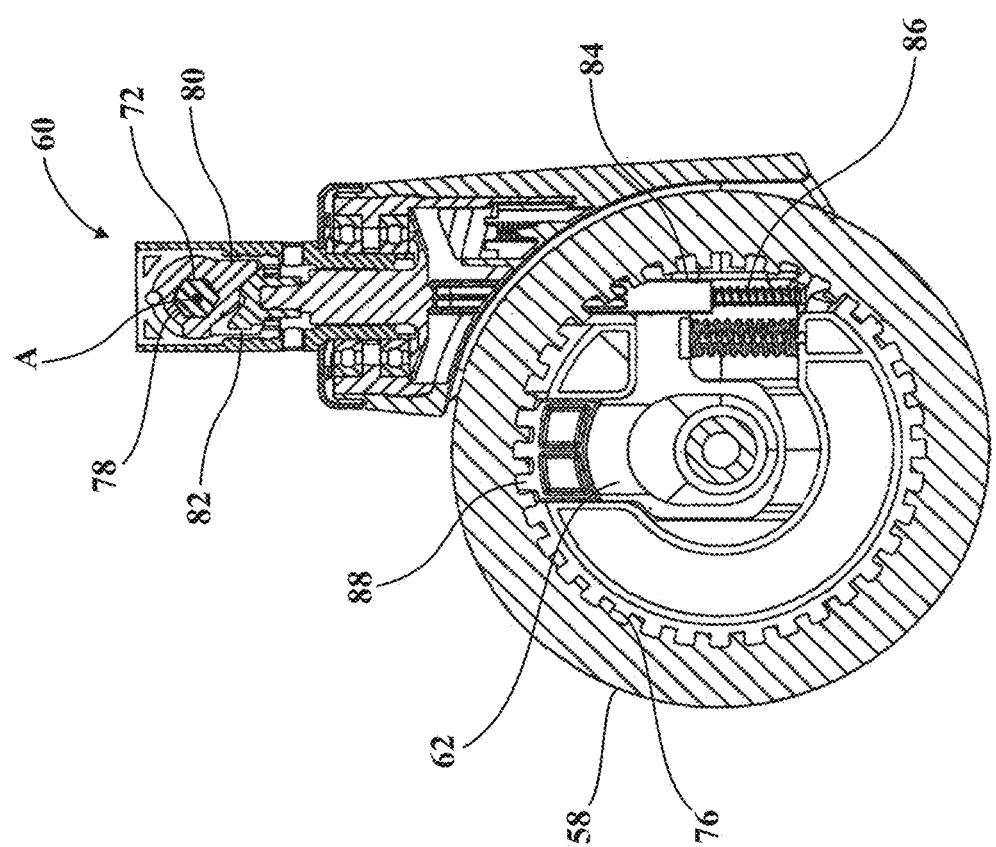
FIG. 5A is a cross-sectional view of a caster assembly that may be used with the electro-mechanical braking system with a brake in a braked state.
Figure 5B:
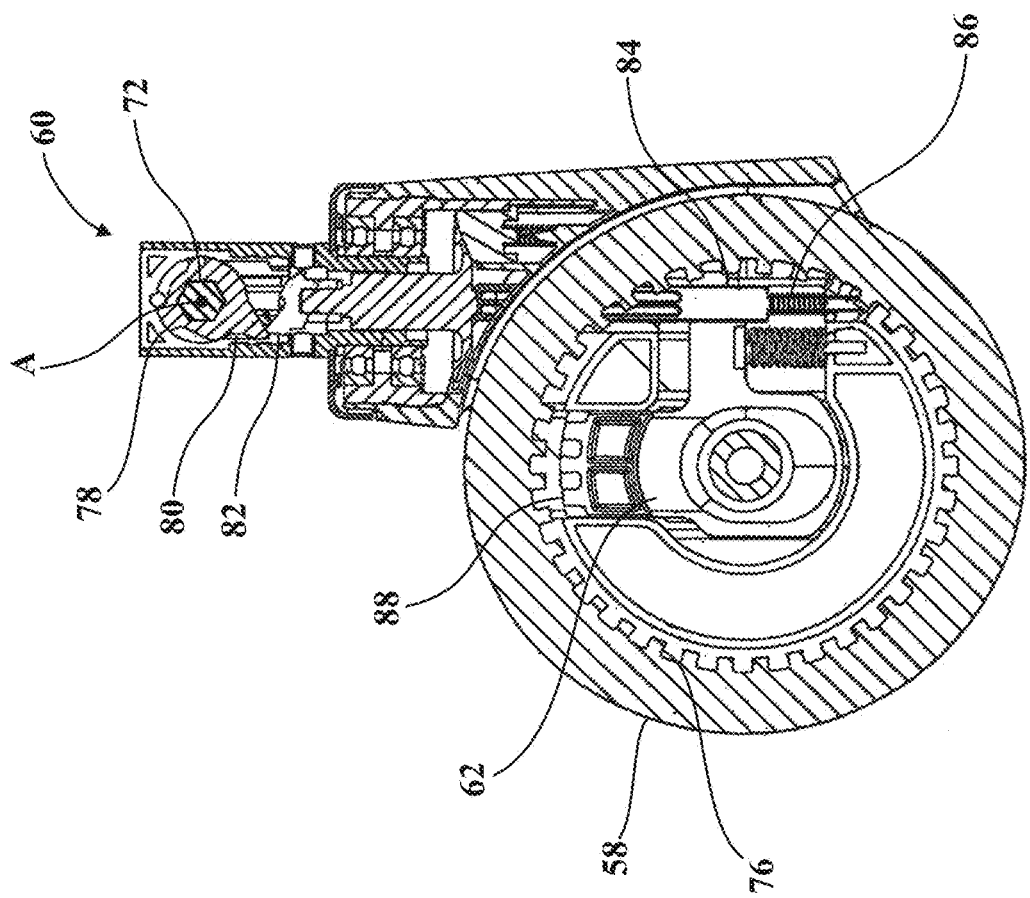
FIG. 5B is a cross-sectional view of a caster assembly that may be used with the electro-mechanical braking system with the brake in a released state.

A mobility arrangement is coupled to the base 34 to facilitate transport over the floor surface. The mobility arrangement includes a plurality of wheels 58. The wheels 58 are arranged in each of four quadrants of the base 34 adjacent to corners of the base 34. In the version shown, the wheels 58 are caster wheels able to rotate and swivel relative to the support structure 32 during transport. Each of the wheels 58 forms part of a caster assembly 60. Each caster assembly 60 is mounted to the base 34 and includes a brake 62 to brake the wheel 58 (one example of which is shown in FIGS. 5A-5B). It should be understood that various configurations of the caster assemblies 60 are contemplated. In addition, in some versions, the wheels 58 are not caster wheels and may be non-steerable, steerable, non-powered, powered, or combinations thereof. Additional wheels are also contemplated. For example, the patient transport apparatus 30 may include four non-powered, non-steerable wheels, along with one or more powered wheels. In some cases, the patient transport apparatus 30 may not include any wheels. In some versions, the patient transport apparatus 30 may be similar to as is described in U.S. Pat. No. 10,045,893, entitled "Patient Transport Apparatus With Controllable Auxiliary Wheel Assembly," the disclosure of which is hereby incorporated by reference in its entirety. Other configurations are contemplated.

In some versions, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient transport apparatus 30. A fifth wheel may also be arranged substantially in a center of the base 34.

Figure 2:
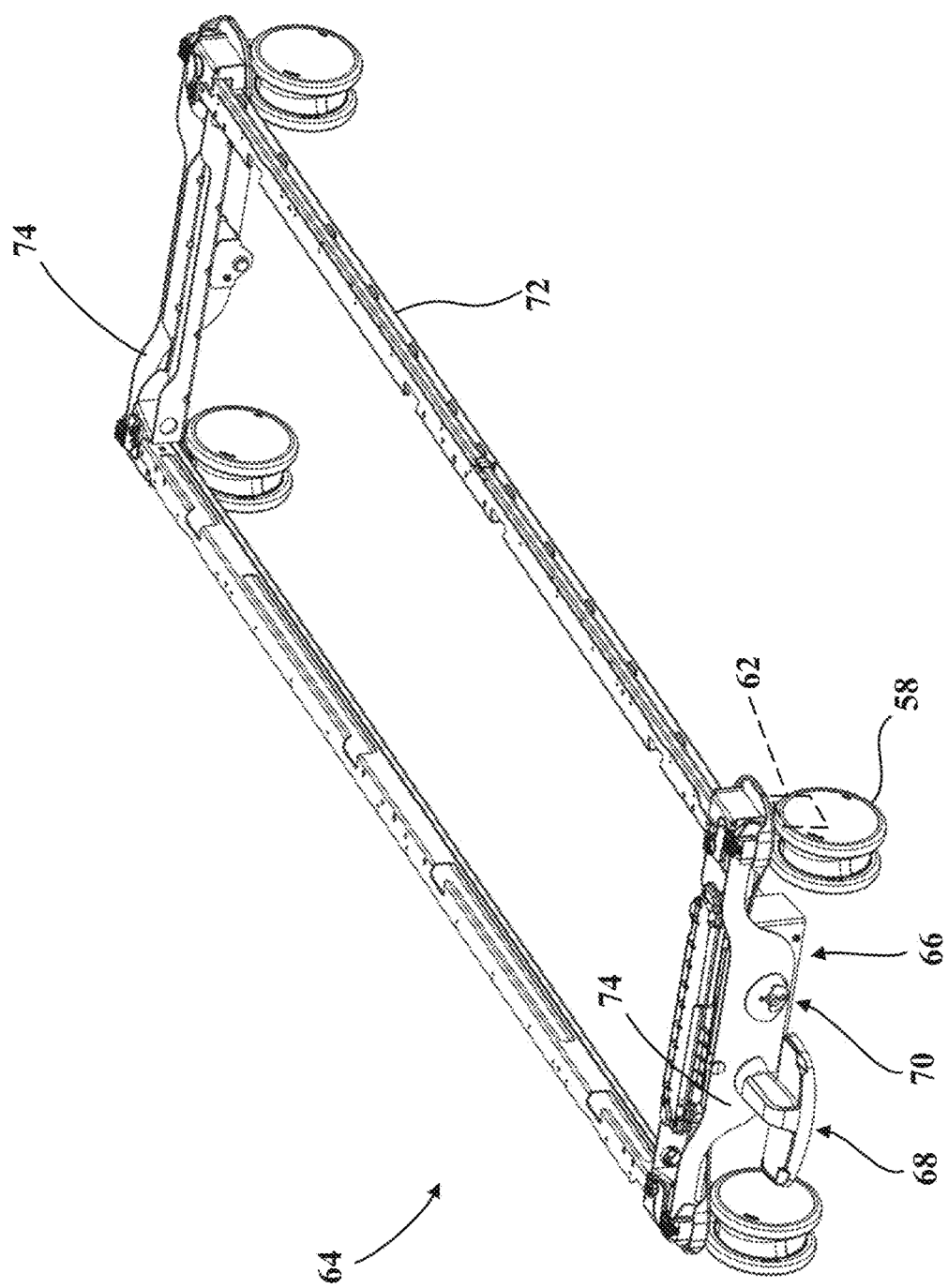
FIG. 2 is a perspective view of a portion of the patient transport apparatus illustrating an electro-mechanical braking system.
Figure 3:
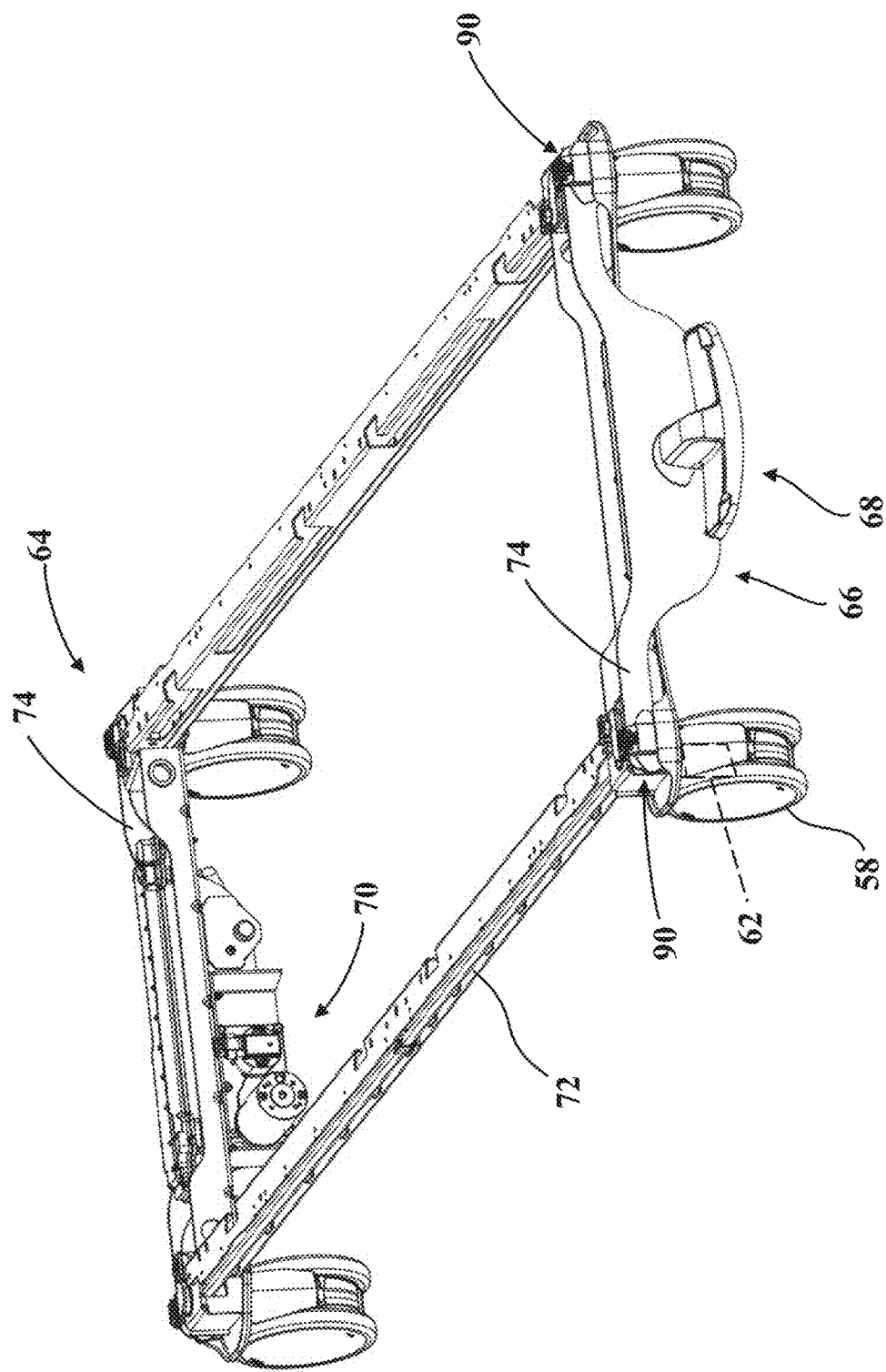
FIG. 3 is another perspective view of the portion of the patient transport apparatus illustrating the electro-mechanical braking system.
Figure 4:
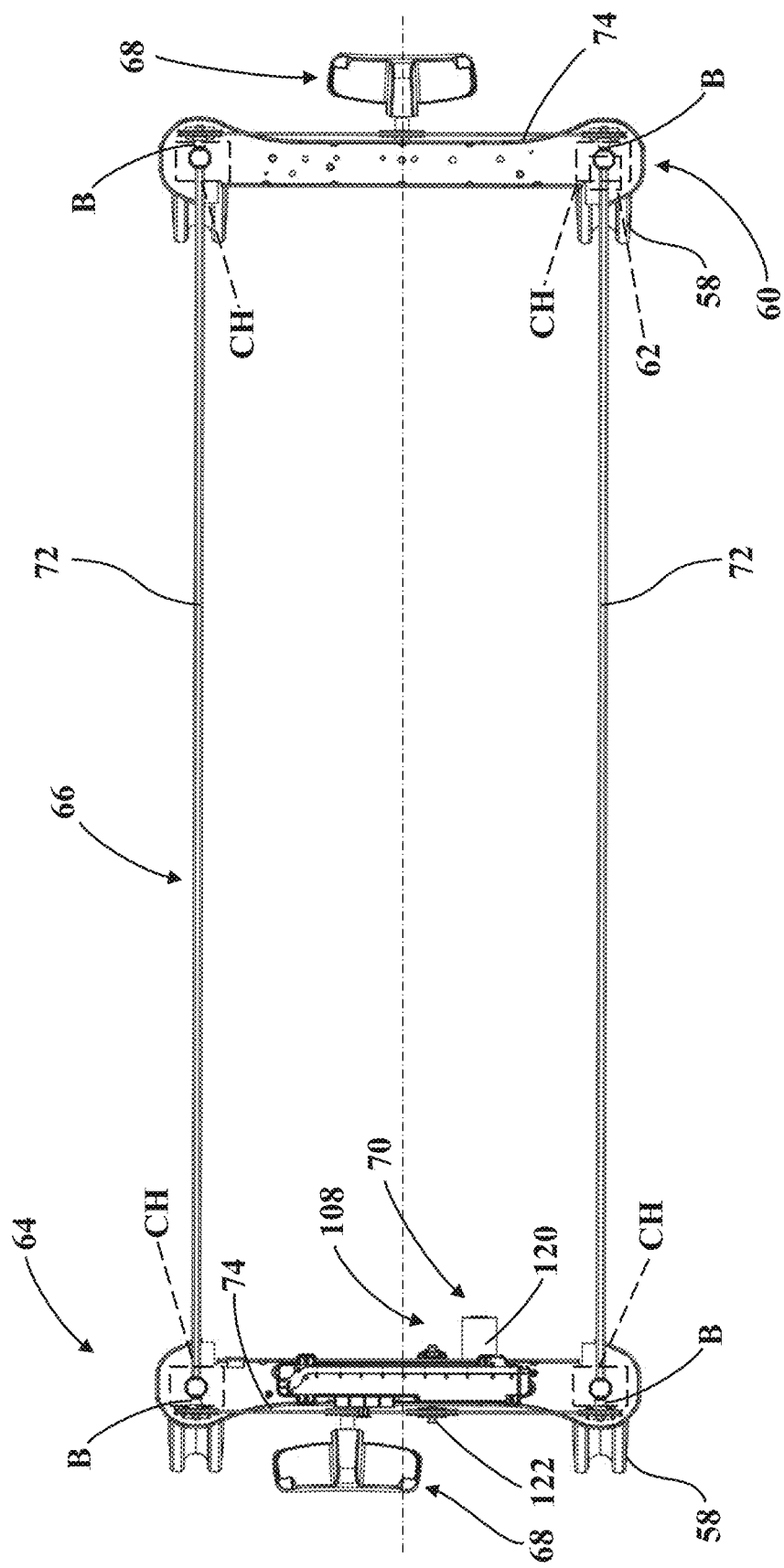
FIG. 4 is a top view of the portion of the patient transport apparatus illustrating the electro-mechanical braking system.

Referring to FIGS. 2-4, the patient transport apparatus 30 includes an electro-mechanical braking system 64 to enable a user, such as a caregiver, to selectively engage or disengage the brakes 62 associated with the wheels 58. The patient transport apparatus 30 is shown in FIGS. 2-4 with the support frame 36 and the patient support deck 38 removed for illustration purposes. It should be appreciated that in the version shown, each of the wheels 58 has an associated brake 62, but in some versions, fewer than all the wheels 58 may have an associated brake 62, e.g., only one, two, or three of the four wheels 58 have an associated brake 62. In some versions, the electro-mechanical braking system 64 may include a plurality of brakes 62 (e.g., two, three, four, etc.) arranged to brake the wheels 58.

The electro-mechanical braking system 64 includes a linkage 66 that is operatively coupled to the brakes 62, a manual actuator 68 that is coupled to the linkage 66, and an electrical braking assembly 70 that is coupled to the linkage 66. The linkage 66 is configured to move in response to actuation via the manual actuator 68 or the electrical braking assembly 70 to operate the brakes 62 as described further below As shown in FIG. 4, the linkage 66 includes a pair of first links 72. In some versions, each of the first links 72 includes an elongated shaft having a hexagonal cross-sectional shape. The first links 72 may also be referred to as hex shafts. The first links 72 extend longitudinally, generally parallel to the longitudinal axis L1, from the head end to the foot end of the patient transport apparatus 30. The first links 72 are rotatably supported by the base 34 for rotation about their axes. For example, the first links 72 may be rotatably supported in a caster housing CH or other bracket of the base 34 via bushings B, bearings, or the like (caster housings CH shown in phantom in FIG. 4).

The linkage 66 further includes a pair of second links 74 arranged laterally at each of the head end and foot end. In some versions, the second links 74 include racks that are gear-driven as described further below. The second links 74 are supported by the base 34 to slide laterally relative to the base 34. Each of the second links 74 is operatively coupled to both the first links 72 such that movement of either of the second links 74 results in corresponding movement of both the first links 72 and movement of the other of the second links 74. In other words, the first links 72 and the second links 74 are operatively interconnected such that movement of any one of the links 72, 74 causes movement of the other links 72, 74. For instance, movement of one of the second links 74 via the manual actuator 68 or the electrical braking assembly 70 functions to slide that second link 74 thereby rotating both the first links 72 to operate the brakes 62.

In the illustrated version, the linkage 66 is arranged and operable to place the brakes 62 in a braked state (shown in FIG. 5A) in which each brake 62 acts to brake movement of a corresponding wheel 58 and a released state (shown in FIG. 5B) in which each brake 62 is released from braking the wheel 58. The released state may also be referred to as a neutral state. The linkage 66 may also be coupled to one or more steer lock mechanisms (not shown) to place the one or more steer lock mechanisms in a steer locked state in which one or more of the wheels 58 are prevented from swiveling, while other wheels 58 remain able to swivel.

As shown in FIGS. 5A and 5B, in some versions, each caster assembly 60 includes a plurality of teeth 76 defined along an interior surface of the wheel 58. An eccentric member 78 is coupled to one of the first links 72 to rotate with the first link 72 about its axis A. The eccentric member 78 (also referred to as a cam) includes an actuating projection 80 that acts on a switching head 82. The switching head 82 is coupled to a switching pin 84 which is moveable in a vertical direction. A compression spring 86 is attached to the switching pin 84 to bias the switching pin 84 in an upward vertical direction toward the eccentric member 78. The brake 62 is coupled to the switching pin 84 and includes a plurality of brake teeth 88 that are arranged to engage the teeth 76 defined along the interior surface of the wheel 58. During operation, as the first link 72 is rotated about its axis A via actuation by the manual actuator 68 or the electrical braking assembly 70, the eccentric member 78 is rotated to move the actuating projection 80 along a profiled surface of the switching head 82 to move the brake 62 between the braked state (FIG. 5A) in which the brake teeth 88 engage the teeth 76 defined along the interior surface of the wheel 58, and the released state (FIG. 5B) in which the brake teeth 88 are spaced a distance from the teeth 76 defined along the interior surface of the wheel 58.

In the version of the patient transport apparatus 30 that is shown, each of the pair of first links 72 extends between two caster assemblies 60 to operate the brakes 62 for two caster assemblies 60. In other words, rotation of one of the first links 72 operates two brakes for two caster assemblies 60 and rotation of the other of the first links 72 operates two brakes for two other caster assemblies 60 so that all four caster assemblies 60 are braked substantially simultaneously (substantially simultaneous owing to any slop or tolerances in the linkage 66).

Other suitable caster assemblies having brakes that operate via a hex shaft or other suitable actuation member could also be used. For example, the caster assemblies and associated brakes may be like those disclosed in U.S. Pat. No. 8,789,662, entitled, "Wheeled Carriage With Brake Lock System," which is hereby incorporated herein by reference. Moreover, the brakes may also be external brakes or other forms of brakes that operate via a linkage, but may not be part of a caster assembly.

Figure 6A:
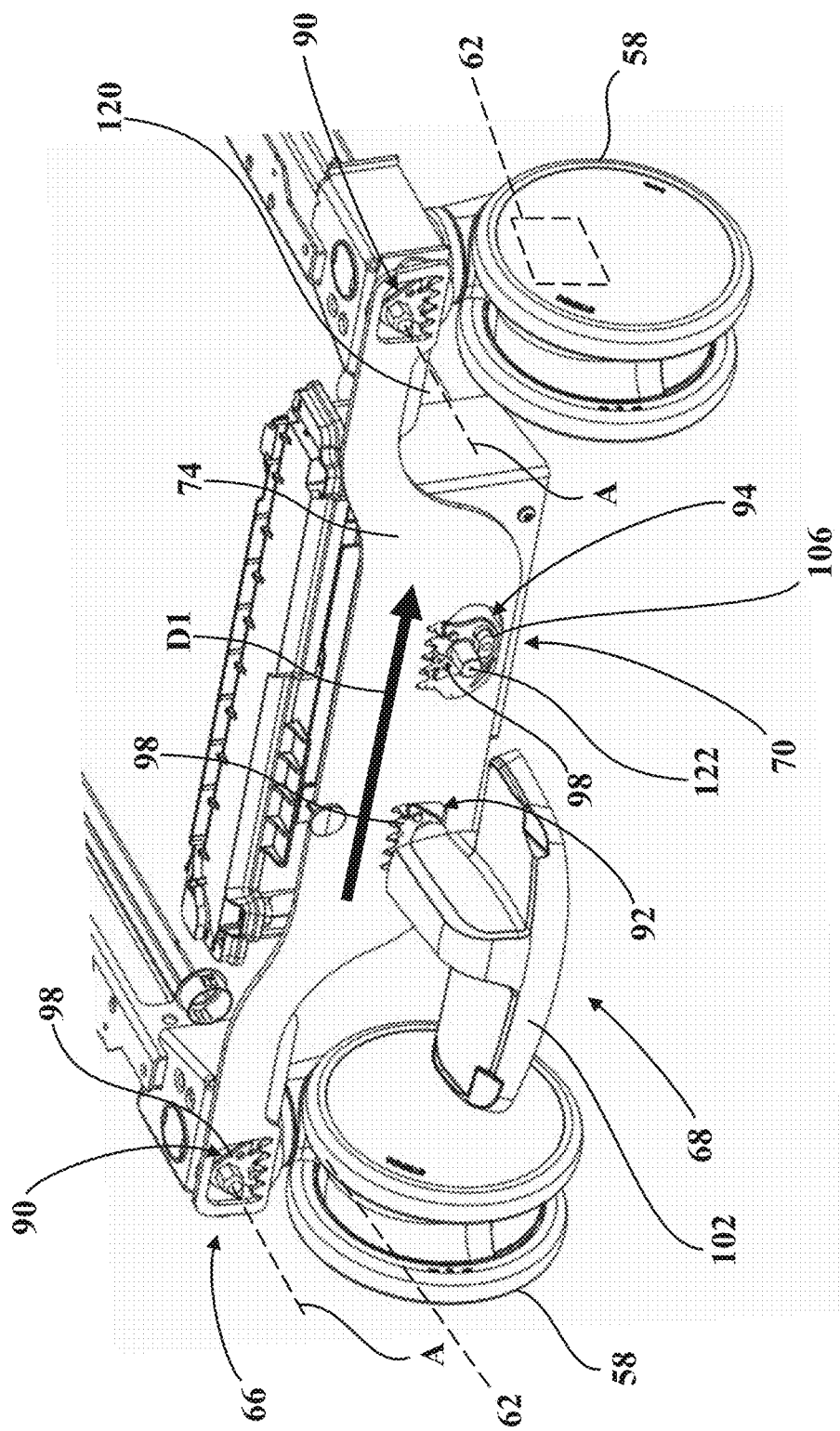
FIGS. 6A-6C are close-up perspective views of a portion of the electro-mechanical braking system in the released, braked, and steer locked states, respectively.
Figure 6B:
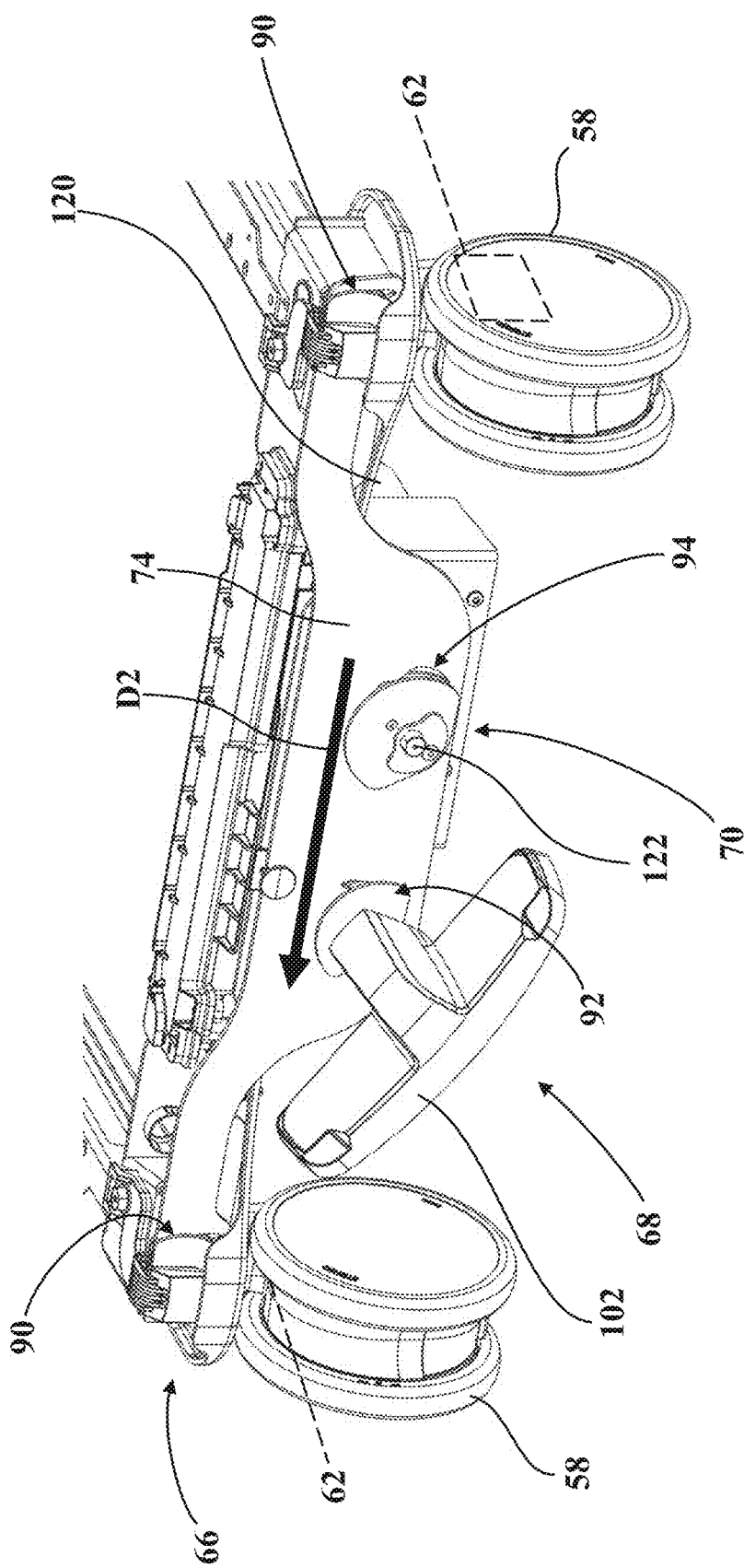
Figure 6C:
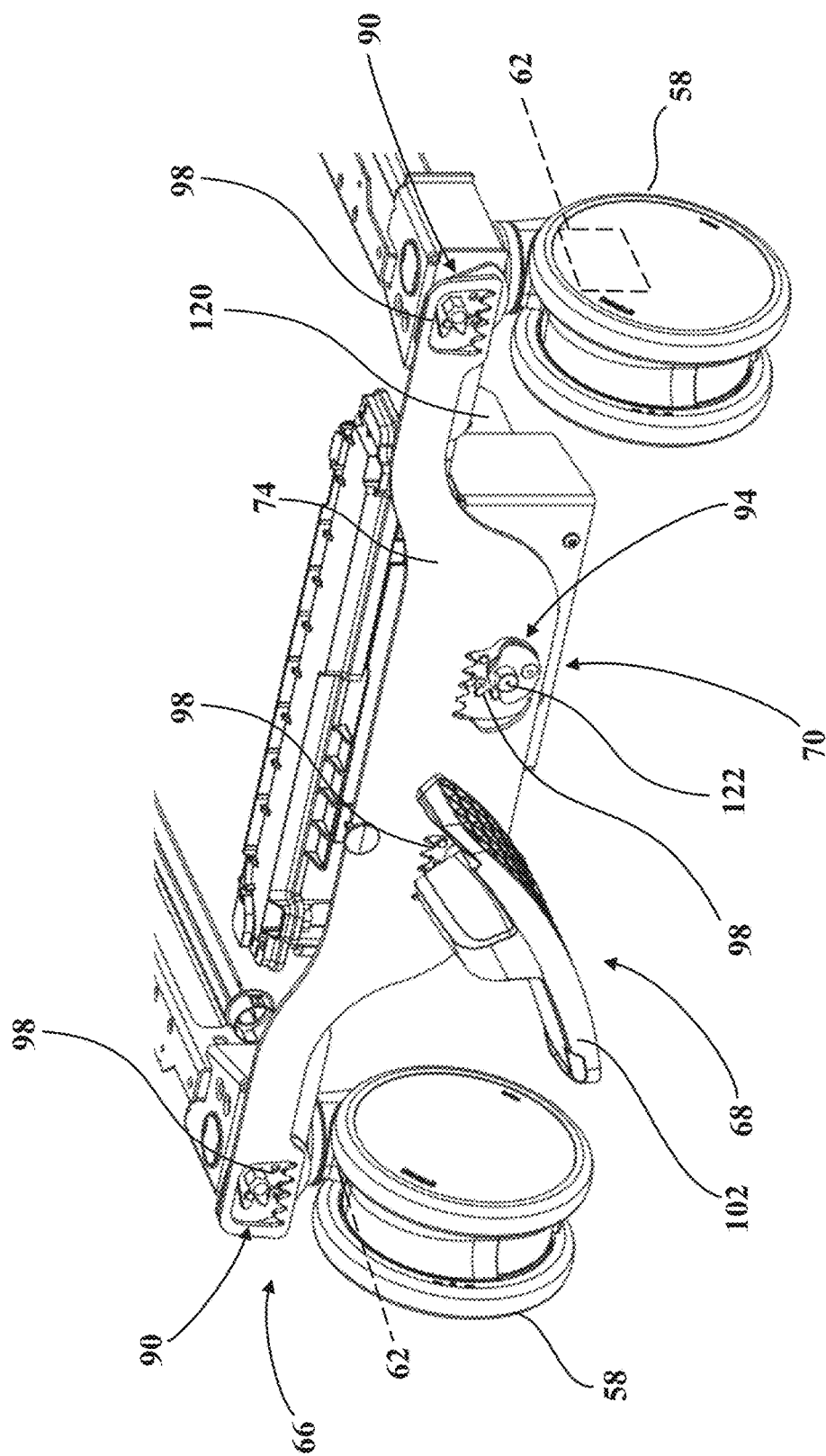

Referring to FIGS. 6A-6C, the manual actuator 68 (one at each of the head end and foot end) is coupled to the linkage 66 to move the linkage 66 manually to place the brakes 62 in the braked state, or in the released state, or to place the steer lock mechanism in the steer locked state. The manual actuators 68 may be operated by a caregiver to place the linkage 66 and the brakes 62 in the released state to release the wheels 58 (FIG. 6A), or may be operated by the caregiver to place the linkage 66 and the brakes 62 in the braked state to brake the wheels 58 (FIG. 6B), or may be operated by the caregiver to place the linkage in the steer locked state (FIG. 6C). The manual actuator 68 shown in FIGS. 6A-6C causes the second link 74 to move in a first direction D1 to place the brake 62 in the braked state (see transition from FIG. 6A to FIG. 6B) and causes the second link 74 to move in a second direction D2 (see transition from FIG. 6B to FIG. 6A) to place the brake 62 in the released state from the braked state. Note that various components of the electro-mechanical braking system 64 are removed in FIGS. 6A-6C for purposes of illustrating motion of the linkage 66 between the various states.

The electrical braking assembly 70 is also coupled to the linkage 66 and includes a motor 120 and drive shaft 122 configured to move the linkage 66 to place the electro-mechanical braking system 64 in the braked state, the released state, and/or the steer locked state. The electrical braking assembly 70 has a driving member 106 described further below that is configured to be moved by the drive shaft 122 to cause the second link 74 to move in the first direction D1 to place the brake 62 in the braked state and to cause the second link 74 to move in the second direction D2 to place the brake 62 in the released state from the braked state. Details of operation of the manual actuator 68, the electrical braking assembly 70, and corresponding movements are described in U.S. Pat. No. 10,806,653, entitled "Patient Transport Apparatus With Electro-Mechanical Braking System," which is hereby incorporated herein by reference.

Referring to FIGS. 7-10, in the illustrated version, the linkage 66 includes a plurality of coupling links 90 (two at both head and foot ends, although only one end is shown). In the version shown, there are four coupling links 90 (two at each end). Each of the coupling links 90 couples one of the first links 72 to one of the second links 74. The linkage 66 further includes a pair of manual drive links 92 (one at each of the head and foot ends). Each of the manual drive links 92 is configured to be directly driven by one of the manual actuators 68 (one at each of the head and foot ends) to cause movement of the linkage 66. The linkage 66 also includes an electric drive link 94. The electric drive link 94 is configured to be driven by the driving member 106 of the electrical braking assembly 70 to cause movement of the linkage 66. Only one electric drive link 94 is present in the version shown, but other electric drive links 94 could be employed.

Figure 7:
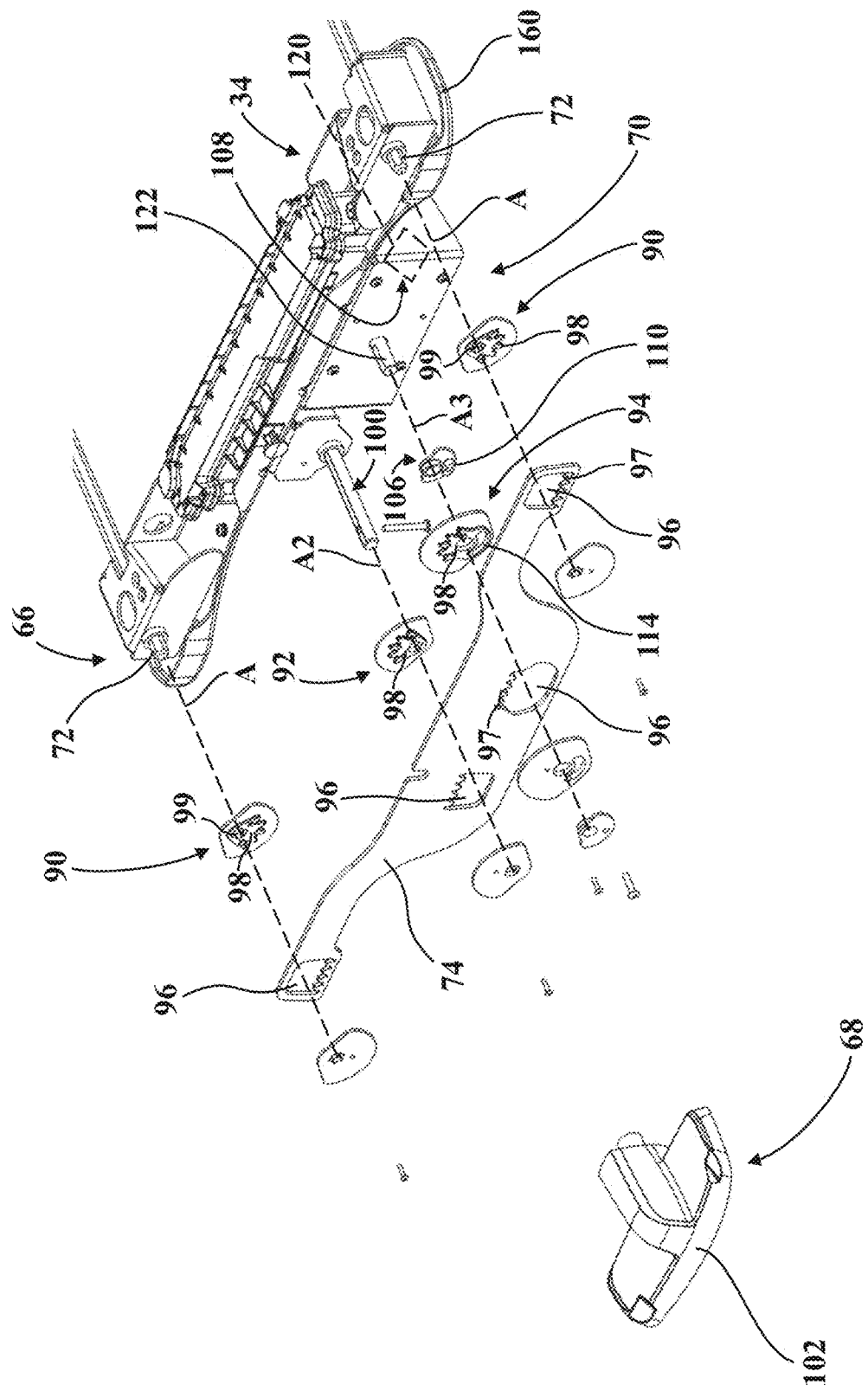
FIG. 7 is a partially exploded, perspective view of portions of a linkage of the electro-mechanical braking system.

As best shown in FIG. 7, each of the second links 74 defines a plurality of engagement slots 96 extending through the second link 74 (only one of the second links 74 shown in FIG. 7). Each engagement slot 96 is sized and shaped to receive a corresponding coupling link 90 or drive link 92, 94 therein. In the illustrated version, each of the coupling links 90 and each of the drive links 92, 94 includes a sector gear 98. The sector gears 98 may be separate components or integral components of the coupling links 90 and the drive links 92, 94. The engagement slots 96 may include a plurality of engagement teeth 97 that are configured to contact corresponding teeth of the sector gear 98 during rotation of the sector gears 98 in their engagement slots 96. The sector gears 98 are positioned within the engagement slots 96 such that movement of the sector gears 98 is linked to movement of the second link 74. More specifically, the rotational axes of the sector gears 98 are fixed relative to the base 34 such that rotation of the sector gears 98 causes sliding movement of the second link 74, i.e., in a rack and pinion fashion, between the various states.

In some versions, the sector gears 98 rotate less than 90 degrees when moving between the various states, and in some cases, less than 60 degrees, or less than 45 degrees, such that the total rotation of the sector gears 98 in the engagement slots 96 is less than 180 degrees, less than 120 degrees, or less than 90 degrees. Additionally, the teeth of the two outer sector gears 98 (i.e., of the coupling links 90) face generally downwardly during operation between the various states while the teeth of two inner sector gears (i.e., of the drive links 92, 94) face generally upwardly during operation between the various states to at least partially constrain vertical motion of the second link 74.

As shown in FIG. 7, each of the coupling links 90 and each of the drive links 92, 94 are formed by two identical halves (including two halves of the sector gears 98) that are sandwiched together through the engagement slots 96 (only one half is numbered). The two halves may have suitable alignment features described further below to mate the halves together. The halves may be fixed to each other by any suitable method, such as welding, adhesive, fasteners, brazing, snap-fit connections, or the like.

The sector gears 98 of the coupling links 90 are mounted to the first links 72, for example, by mating hexagonal shaped through openings 99 of the sector gears 98 onto the hex shafts. The sector gears 98 of the coupling links 90 could be mounted to the first links 72 in other ways such that these sector gears 98 rotate with the first links 72 during operation of the linkage 66. The sector gear 98 of the manual drive link 92 is mounted to a manual actuation shaft 100 of the manual actuator 68. The manual actuation shaft 100 is rotatably supported by the base 34. This sector gear 98 is mounted to the manual actuation shaft 100, e.g., via a mating double-D connection, to rotate with the manual actuation shaft 100 about its axis A2 when the manual actuator 68 is being actuated by a caregiver (or when the manual actuation shaft 100 is being passively rotated, such as during actuation by the electrical braking assembly 70). The sector gear 98 of the electric drive link 94 is responsive to operation of the electrical braking assembly 70 to rotate about an axis A3 of the drive shaft 122 as described further below. During operation of the linkage 66, the sectors gears 98 rotate about their corresponding axes A, A2, A3, the second links 74 slide, and the first links 72 rotate about their axes A to move the plurality of brakes 62 between the various states (see again FIGS. 5A and 5B).

Referring briefly back to FIGS. 6A and 6B, during operation of the electro-mechanical braking system 64, as the second link 74 slides in the first direction D1 (e.g., via actuation by the manual actuator 68 and the manual drive link 92, or via actuation by the electrical braking assembly 70 and the electric drive link 94), the second link 74 causes a movement of the coupling links 90 (via the sector gear 98 and teeth 97 engagement) which rotates the first links 72 in a counter-clockwise direction about their axes A to move the brakes 62 to the braked state (FIG. 6B). As the second link 74 slides in the second direction D2, the second link 74 moves the coupling links 90 to rotate the first links 72 about their axes A in a clockwise direction to move the corresponding brakes 62 to the released state (FIG. 6A). Further movement of the first links 72 in the clockwise direction, in some versions, moves the steer lock mechanism to the steer locked state.

Of course, while movement of only one of the second links 74 is described above, such movement also causes movement of the other second link 74 as the first and second links 72, 74 are interconnected to be substantially simultaneously operated. More specifically, the other second link 74 also slides by virtue of the coupling links 90 present at the opposite end of the patient transport apparatus 30. These coupling links 90 couple the first links 72 to the other second link 74 (see FIG. 3). The first links 72 and the other second link 74 are coupled to these coupling links 90 in the same manner described above for the coupling links 90 shown in FIGS. 7-10. In some versions, there may be only one second link 74 and only one manual actuator 68, e.g., the other manual actuator 68 and the other second link 74 may be absent.

Figure 8:
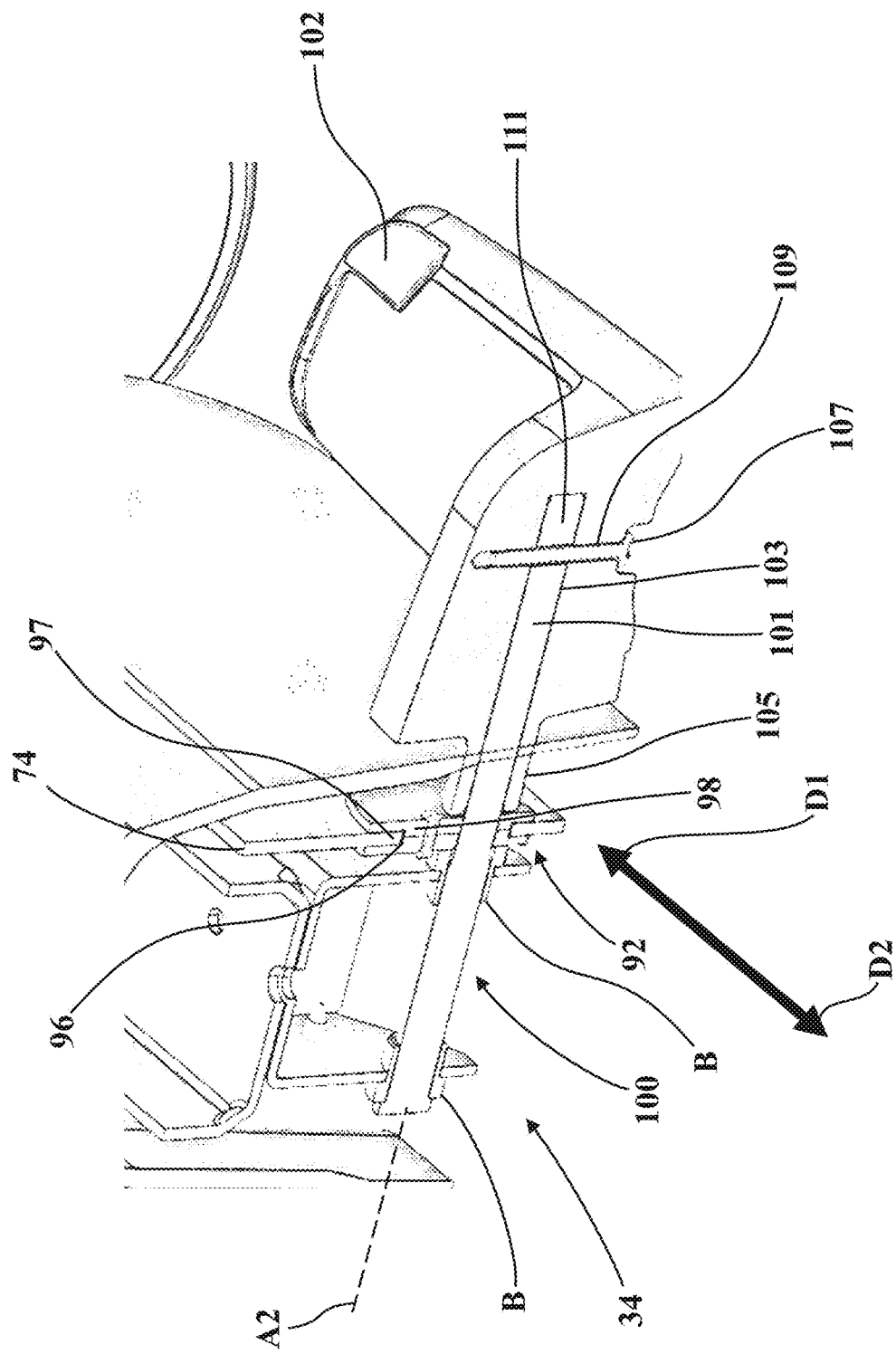
FIG. 8 is a cross-sectional, perspective view of a manual actuator of the electro-mechanical braking system.
Figure 9A:
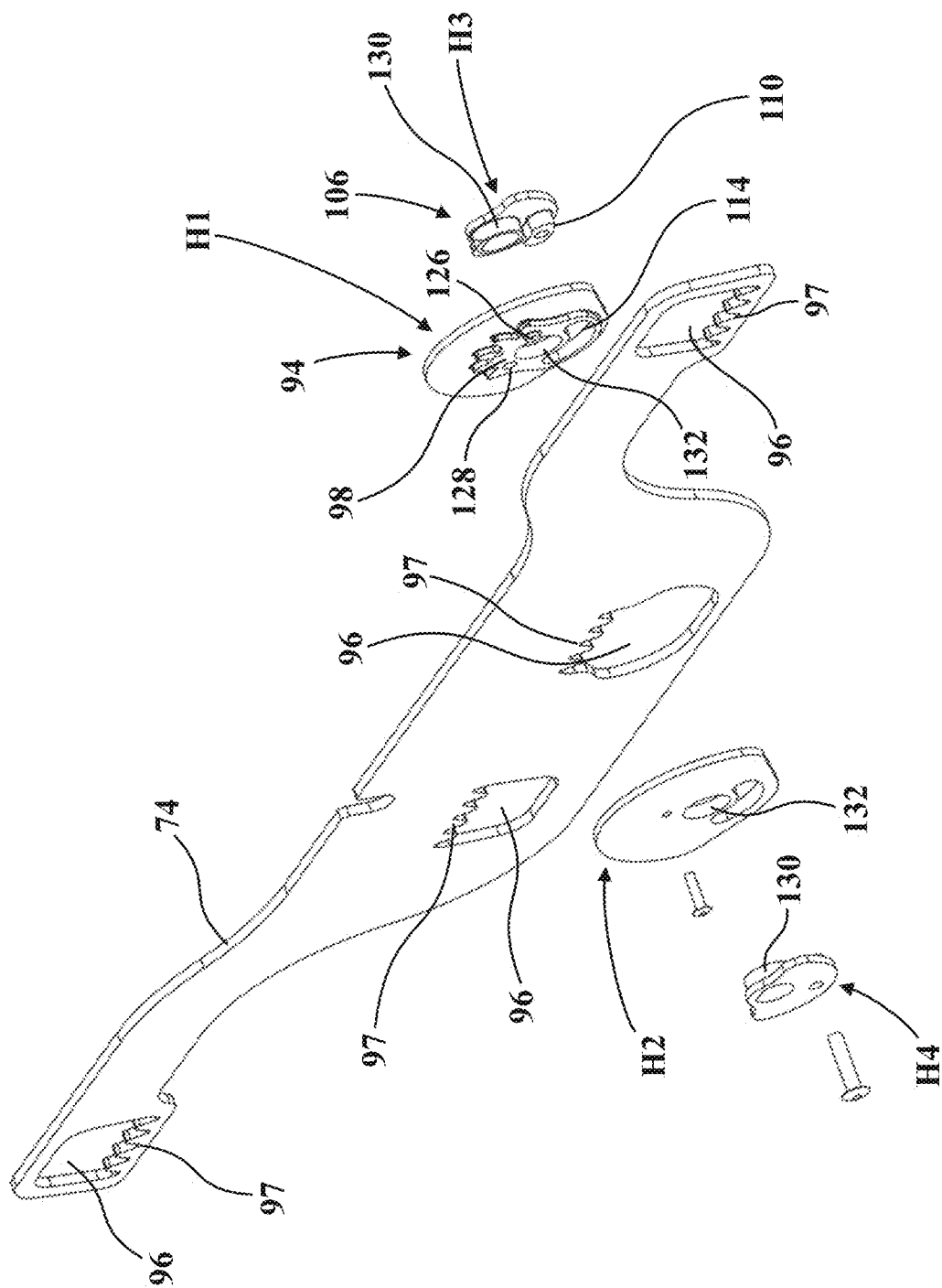
FIG. 9A is an exploded, perspective view of an electric drive link and driving member.
Figure 9B:
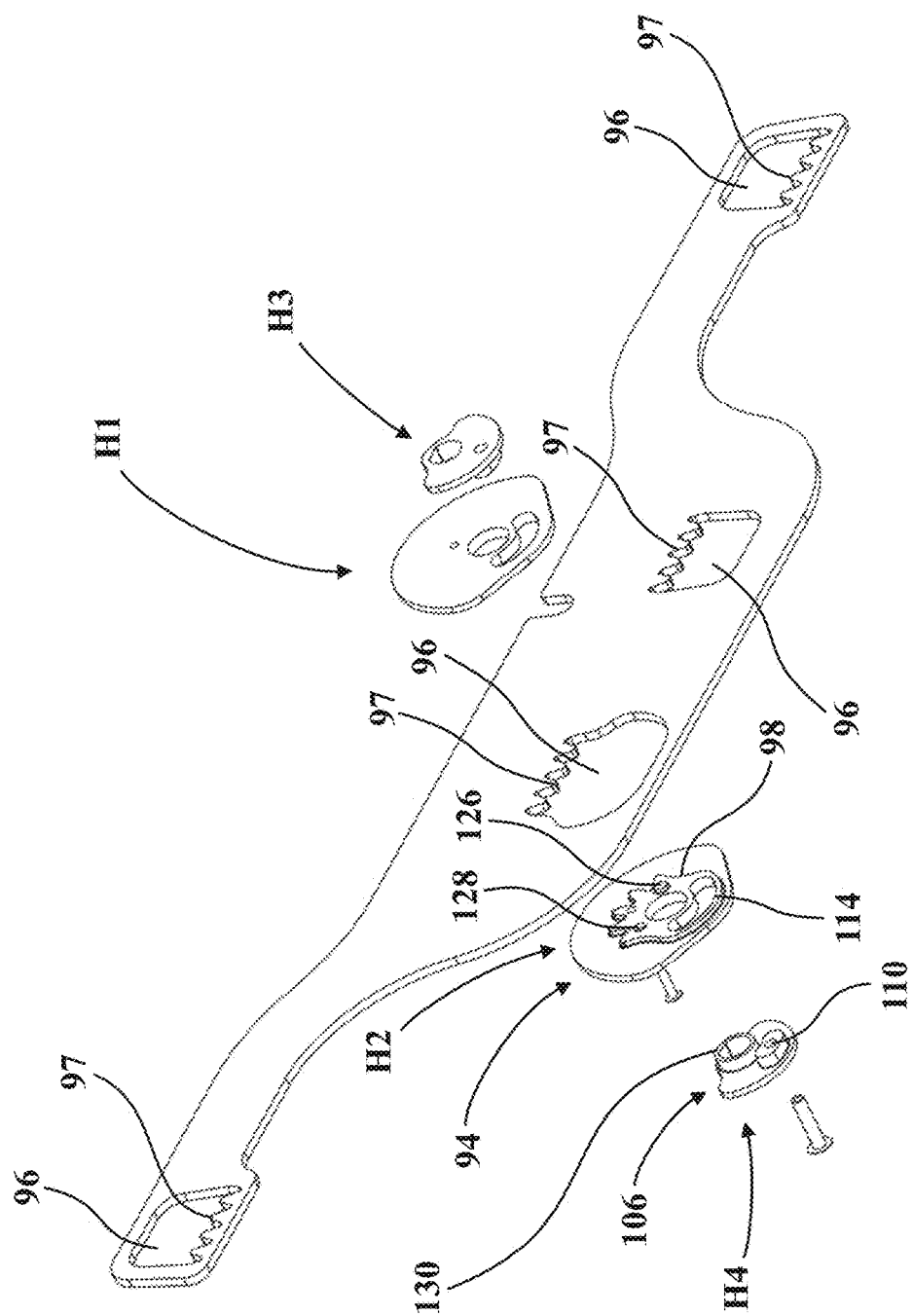
FIG. 9B is another exploded, perspective view of the electric drive link and the driving member.
Figure 10:
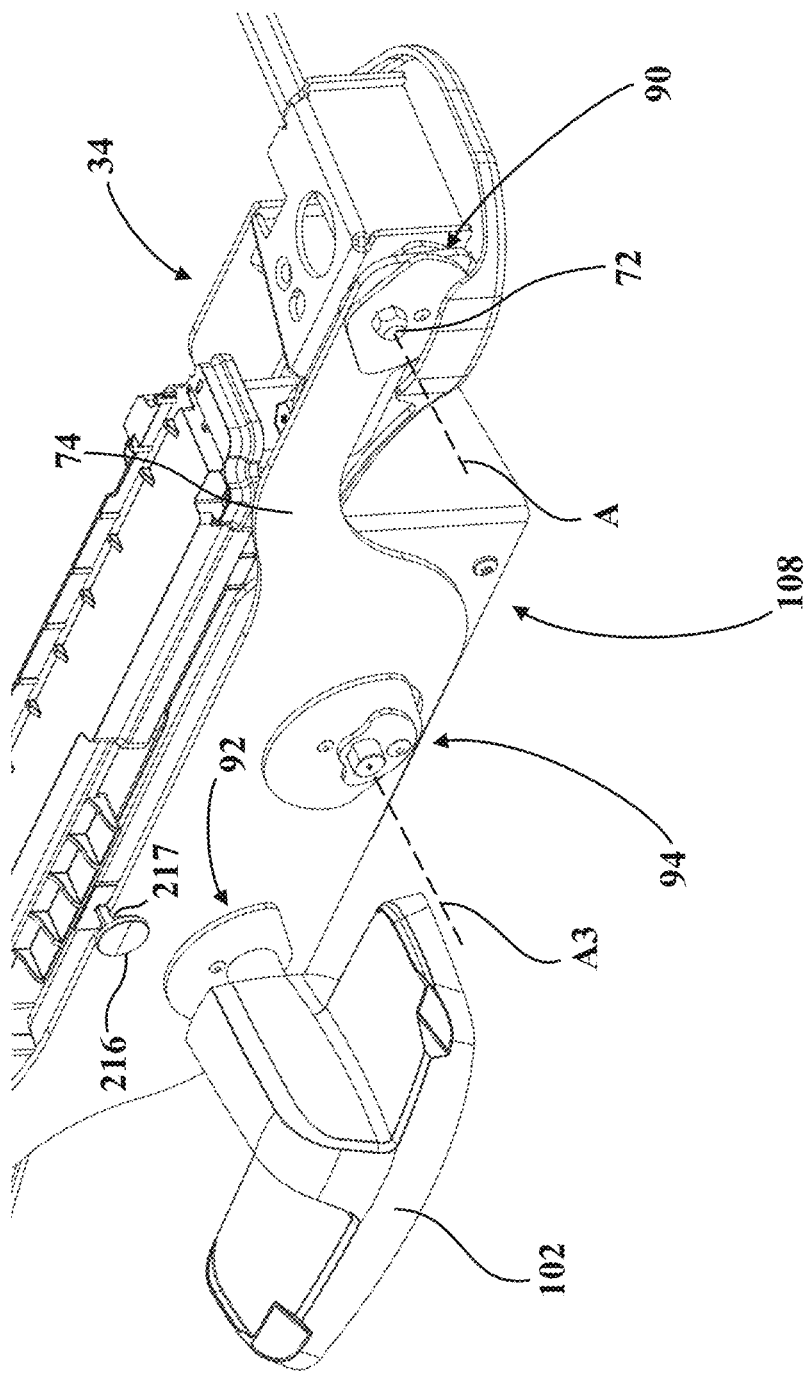
FIG. 10 is a perspective view of the electric drive link and the driving member.

Referring to FIGS. 7 and 8, the manual drive link 92 is coupled to the manual actuator 68 to enable the second link 74 to be moved in the first direction D1 and the second direction D2 manually. In the illustrated version, the manual actuator 68 includes the manual actuation shaft 100 and a brake pedal 102 that is coupled to the manual actuation shaft 100. The manual actuation shaft 100 is coupled to the brake pedal 102 such that a rotation of the brake pedal 102 causes a rotation of the manual actuation shaft 100 and corresponding rotation of the manual drive link 92, which causes the second link 74 to slide in the first direction D1 or the second direction D2. For example, the sector gear 98 of the manual drive link 92 is configured to contact the engagement teeth 97 of the corresponding engagement slot 96 such that a rotation of the manual drive link 92 causes sliding of the second link 74. During operation, a caregiver may operate the brake pedal 102 to rotate the manual actuation shaft 100 and the manual drive link 92 in a clockwise direction to move the second link 74 in the first direction D1 to cause the brakes 62 to move to the braked state. The caregiver may operate the brake pedal 102 to rotate the manual actuation shaft 100 and the manual drive link 92 in a counter-clockwise direction to move the second link 74 in the second direction D2 to cause the brakes 62 to move to the released state. Further movement in the second direction D2, in some versions, causes the steer lock mechanism to move to the steer locked state.

Referring specifically to FIG. 8, in the version shown, the manual actuation shaft 100 is supported for rotation in the base 34 about axis A2 (e.g., in a housing or bracket of the base 34 as shown in FIG. 8) by suitable bushings B or bearings. A double-D portion 101 of the manual actuation shaft 100 passes through the manual drive link 92 and is suitably mated thereto (e.g., via a mating double-D opening in the manual drive link 92) for like rotation. The double-D portion 101 has a double-D cross-sectional shape or other suitable rotation-limiting shape that mates with a similarly-shaped through opening in the manual drive link 92. The brake pedal 102 also defines a double-D shaped bore 103 (or other suitable shape) to receive the double-D portion 101 of the manual actuation shaft 100 such that rotation of the brake pedal 102 results in rotation of the manual actuation shaft 100 and like rotation of the manual drive link 92. The brake pedal 102 has a boss 105 that passes through an opening in cladding fixed to the base 34 that shields the manual drive link 92. A fastener 107 (e.g., screw, bolt, etc.) is inserted into another bore 109 of the brake pedal 102 that is transverse to the bore 103. The fastener 107 passes through a transverse throughhole 111 in the double-D portion 101 of the manual actuation shaft 100 to axially secure the brake pedal 102 onto the manual actuation shaft 100. The other end of the manual actuation shaft 100 is enlarged to axially hold the manual actuation shaft 100 to the base 34 while allowing the manual actuation shaft 100 to rotate relative to the base 34.

In some versions, the brake pedal 102 is formed by injection molding, and the bore 103 may be formed using a hydraulic slide such that the bore 103 has 0 degrees of draft to allow for a tight fit with the double-D portion 101 of the manual actuation shaft 100 and enable a load applied by a caregiver to travel through the brake pedal 102. The fastener 107 may be a removable fastener that is a plastic thread former that threads into plastic of the brake pedal 102 on both sides of the double-D portion 101 to provide a secure retention of the brake pedal 102 to prevent the brake pedal 102 from sliding off the double-D portion 101. Also, if the double-D portion 101 fails, the fastener 107 will act as the primary load bearing component. A size #10 fastener, or other suitable fastener, may be used.

Referring to FIGS. 7-11, the electrical braking assembly 70 includes the driving member 106, the motor 120 (best shown in FIG. 4), and the drive shaft 122. The motor 120 and drive shaft 122 form part of an actuator assembly 108. The actuator assembly 108 is coupled to the driving member 106 to provide torque to move the second link 74 in the first and second directions D1, D2. The driving member 106 has a driving protrusion 110. The electric drive link 94 includes a positioning slot 114 that is sized and shaped to receive the driving protrusion 110 therein. The positioning slot 114 provides an arcuate travel path for the driving protrusion 110 and is sized so that the driving protrusion 110 is movable along the travel path. The driving protrusion 110 is sized and shaped to contact ends of the travel path of the positioning slot 114. Once either end of the travel path is contacted, then further rotation of the driving protrusion 110 causes a rotation of the electric drive link 94 about its axis A3 and corresponding movement of the second link 74. When the electric drive link 94 rotates about axis A3 via the driving protrusion 110, the sector gear 98 of the electric drive link 94 rotates in its engagement slot 96 to drive the second link 74 as previously described.

The driving member 106 is configured to be moved by the motor 120 and drive shaft 122 to a first position, a second position, and a home position (and in some cases a third position if steer lock is employed). The electrical braking assembly 70 powers the driving member 106 to the first position to cause the second link 74 to move in the first direction D1 to place the brake 62 in the braked state and to the second position to cause the second link 74 to move in the second direction D2 to place the brake 62 in the released state from the braked state. The electrical braking assembly 70 operates to move the driving member 106 to the home position (between the first and second positions) to allow the second link 74 to move freely (without backdriving the motor 120) and enable the brakes 62 to be manually actuated with either of the manual actuators 68. Movements between the first, second, and home positions are described in detail in U.S. Pat. No. 10,806,653, entitled "Patient Transport Apparatus With Electro-Mechanical Braking System," which is hereby incorporated herein by reference.

As best shown in FIGS. 9A-11, the electric drive link 94 may be formed of identical halves H1, H2 that are sandwiched together through the corresponding engagement slot 96 in the second link 74. The two halves H1, H2 of the electric drive link 94 may have suitable alignment features to align the two halves for mating (e.g., see studs 126 and pockets 128). Similarly, the driving member 106 may be formed of identical halves H3, H4 that are sandwiched together through the corresponding engagement slot 96. In this case, there are two halves to the driving protrusion 110 that meet within two halves of the positioning slot 114. Each of the two halves H3, H4 of the driving member 106 also have a cylindrical boss 130 sized and shaped to pass through corresponding openings 132 in the two halves H1, H2 of the drive link 94.

Figure 11:
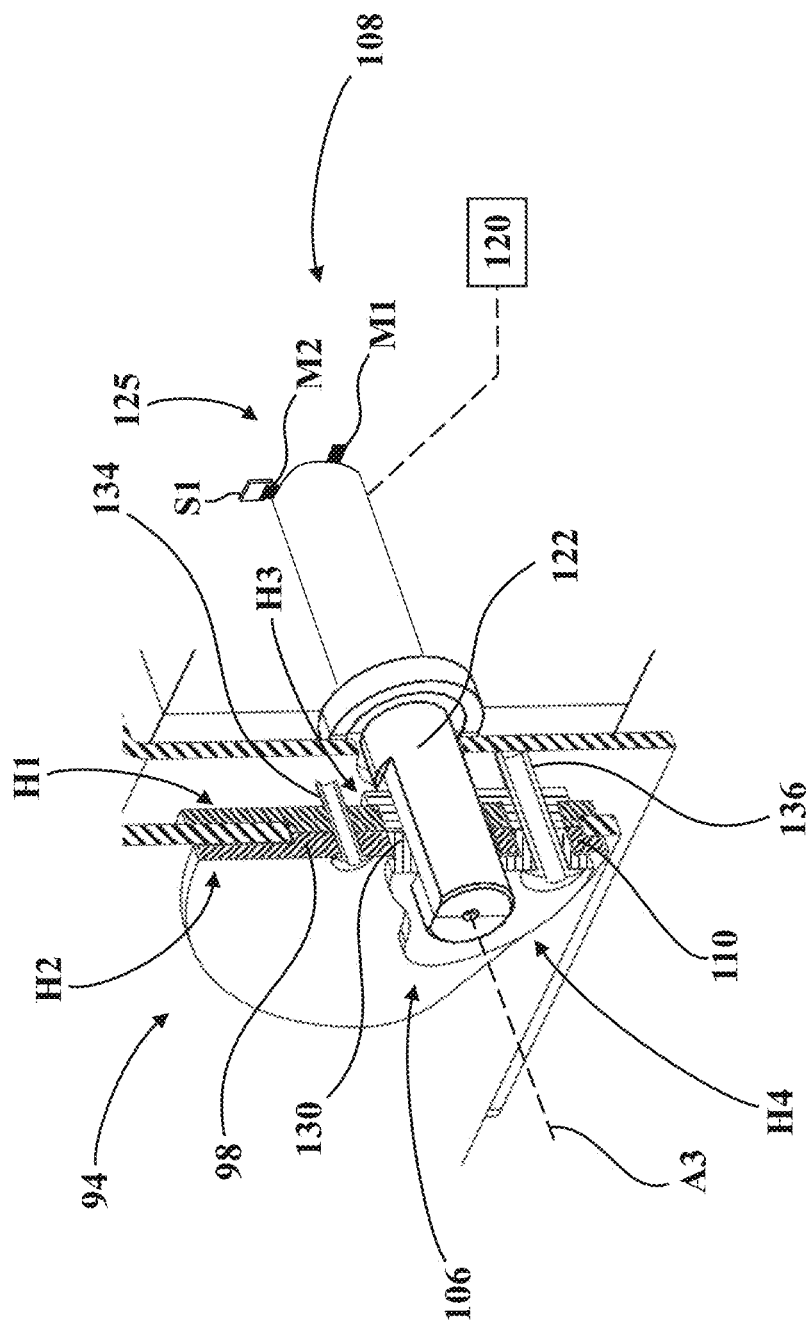
FIG. 11 is a cross-sectional, perspective view of the electric drive link and the driving member.

As shown in FIG. 11, a first rivet 134, or other suitable fastener, secures the two halves H1, H2 of the drive link 94 together. A second rivet 136, or other suitable fastener, secures the two halves H3, H4 of the driving member 106 together and captures the two halves H1, H2 between the two halves H3, H4. The second rivet 136 also passes through the slot 114 in the two halves H1, H2. This facilitates rotation of the driving member 106 relative to the drive link 94 during operation. Providing two separate rivets 134, 136 through the sector gear 98 of the drive link 94 helps to prevent the two halves of the sector gear 98 from flaring apart.

The actuator assembly 108 may include linear actuators, rotary actuators, or other types of actuators. The actuator assembly 108 be electrically operated, electro-hydraulic, hydraulic, pneumatic, and the like. In the illustrated version, the actuator assembly 108 includes the motor 120 (e.g., an electric motor) and the drive shaft 122 that is rotatably coupled to the motor 120, either directly or through a gear train. The driving member 106 is coupled to the drive shaft 122 such that a rotation of the drive shaft 122 rotates the driving protrusion 110, e.g., the driving protrusion 110 is mounted to the drive shaft 122 to rotate with the drive shaft 122. The motor 120 rotates the driving protrusion 110 through the various positions as defined and described in U.S. Pat. No. 10,806,653, entitled "Patient Transport Apparatus With Electro-Mechanical Braking System," which is hereby incorporated herein by reference. The linkage 66 is coupled to the brakes 62 such that a rotation of the electric drive link 94 causes the linkage 66 to operate the brakes 62 to place the brakes 62 in the braked state, or the released state, or to place the steer lock mechanism in the steer locked state.

Figure 11A:
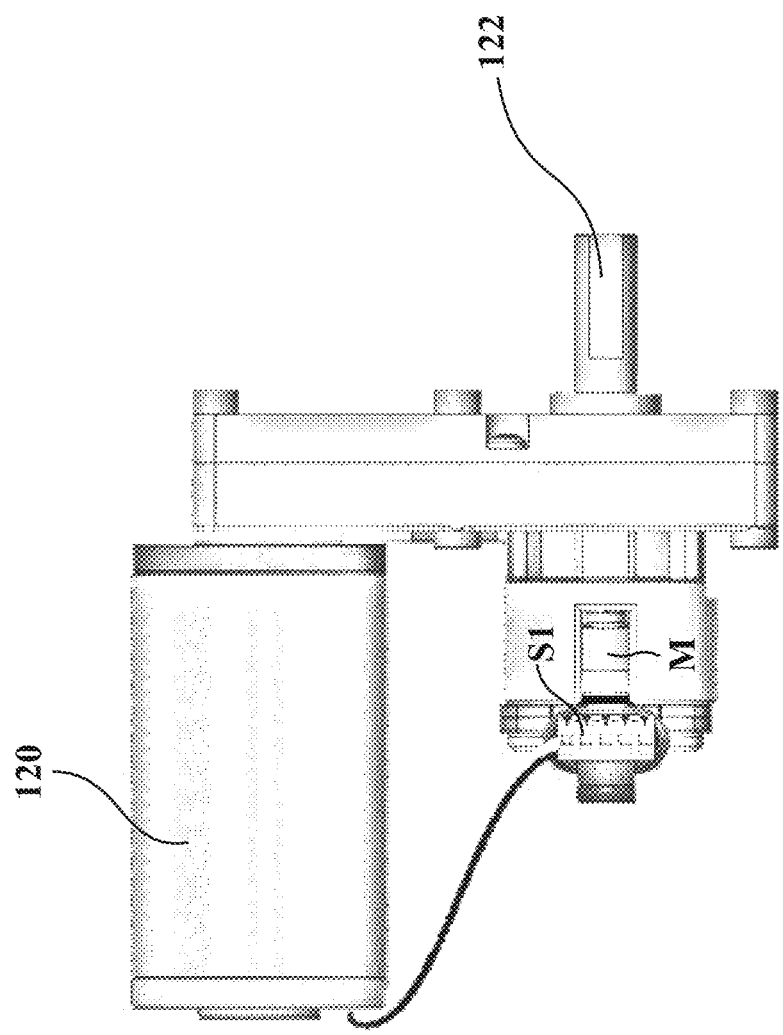
FIG. 11A is a top view of a motor and drive shaft arrangement illustrating a sensor and magnet.

Still referring to FIG. 11, in the illustrated version, the electrical braking assembly 70 includes a sensor assembly 125 that is configured to sense a position of the driving member 106. In one version, the sensor assembly 125 includes a pair of magnets M1, M2 fixed to the drive shaft 122 (which is either directly driven by the motor 120 or through a gear train). The sensor assembly 125 also includes a sensor S1, such as a hall-effect sensor. The magnets M1, M2 are generally positioned at a 90-degree offset (rotational angle) about the drive shaft 122. The magnets M1, M2 are fixed to the drive shaft 122 such that a rotation of the drive shaft 122 rotates the magnets M1, M2 relative to the sensor S1. The sensor S1 is fixed relative to the base 34 (e.g., in a sensor housing fixed to the base 34) to sense the movement of the magnets M1, M2 in a contactless fashion. The sensor S1 and a single magnet M3 may also be arranged as shown in FIG. 11A. Other arrangements are also contemplated. A controller 202 is coupled to the sensor S1 to determine the position of the drive shaft 122 by virtue of the controller 202 receiving a varying voltage signal from the sensor S1. For example, the sensor S1 is arranged to generate a specific voltage or voltage range when the driving member 106 is at the home position, and the controller 202 can thereby store this range for purposes of later driving the drive shaft 122 to reach the home position. The controller 202 can thus monitor the output from the sensor S1 to determine the position of the driving member 106.

The controller 202 is coupled to the motor 120 to control operation of the motor 120 based on input from the sensor S1 so that the motor 120 is able to rotate the drive shaft 122 and move the driving member 106 as needed to place the brakes 62 in the braked state, released state, or to place the steer lock mechanism in the steer locked state. Other sensor types are also contemplated, such as optical encoders, rotary hall-effect sensors, linear hall-effect sensors, proximity sensors, toggle switches, limit switches, or the like. For example, an absolute position encoder may be used to sense a rotational position of the drive shaft 122.

Figure 12A:
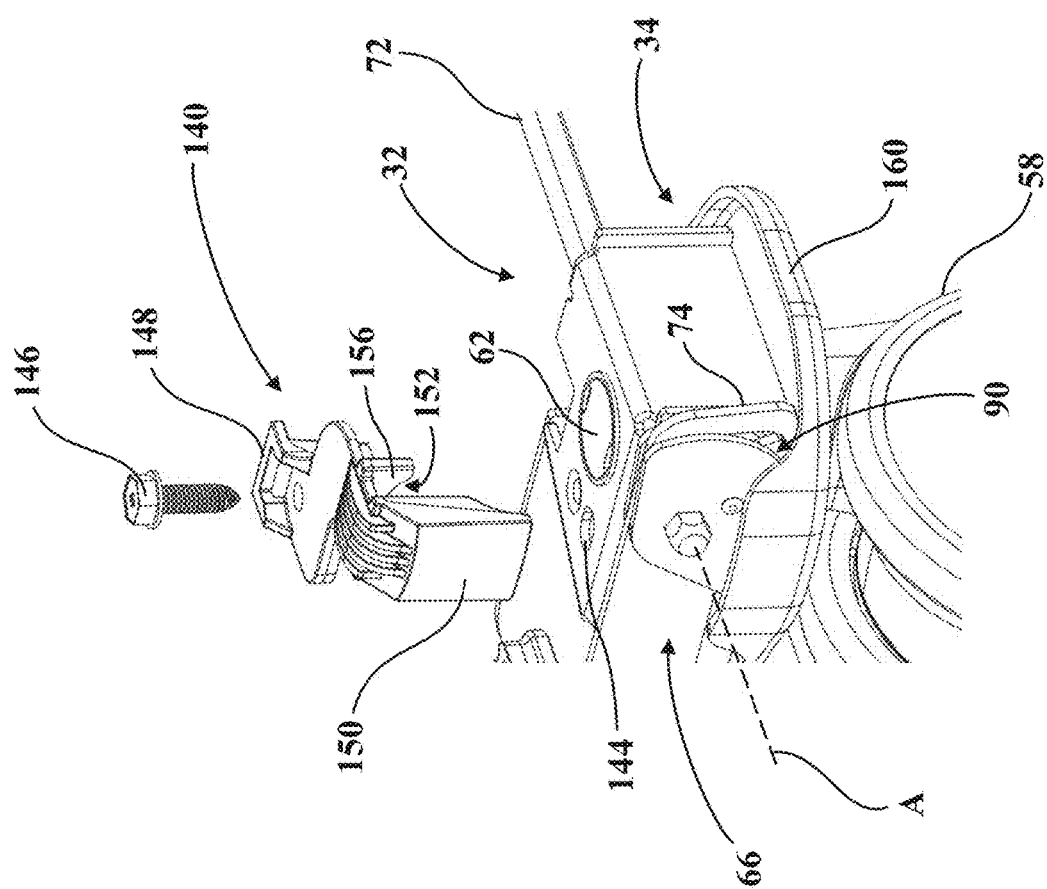
FIG. 12A is a partially exploded, perspective view illustrating a retainer for the linkage.
Figure 12B:
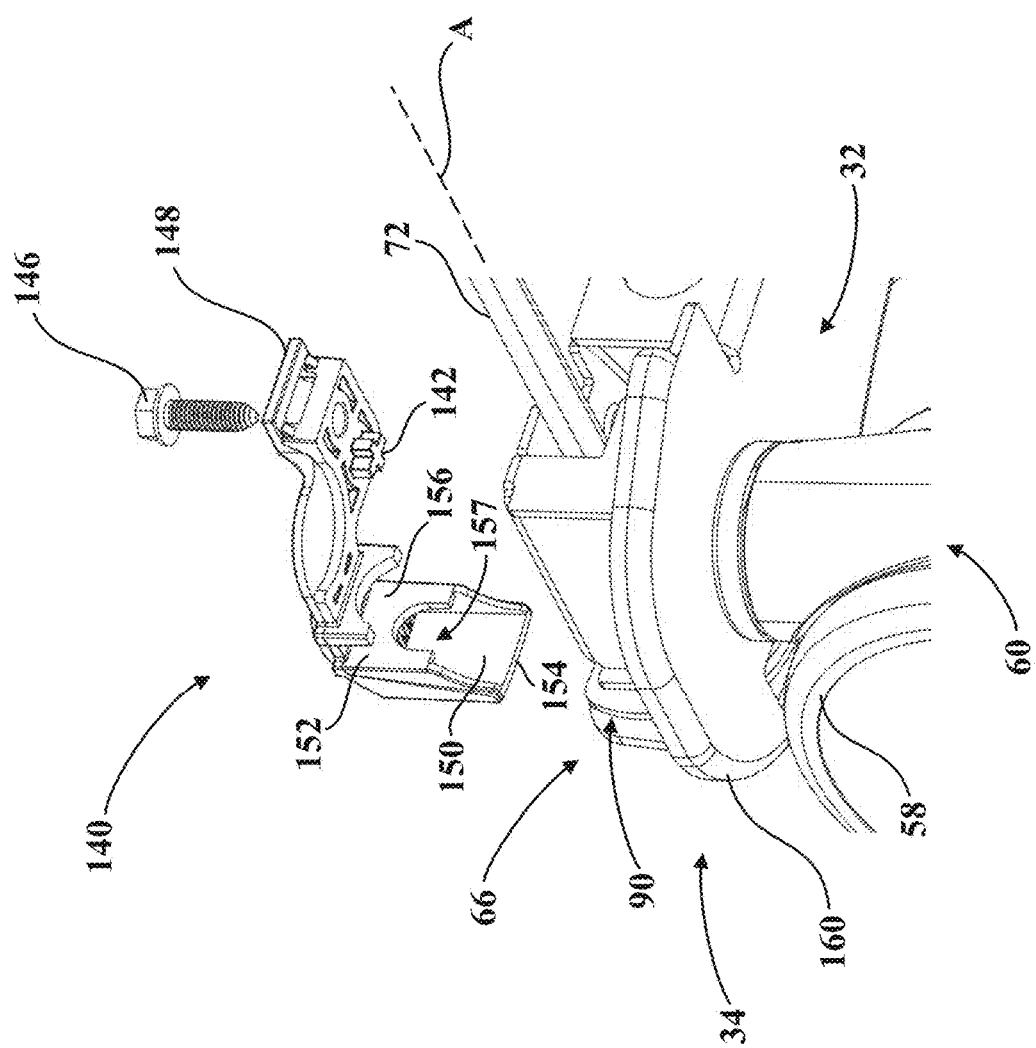
FIG. 12B is another partially exploded, perspective view illustrating the retainer for the linkage.
Figure 13:
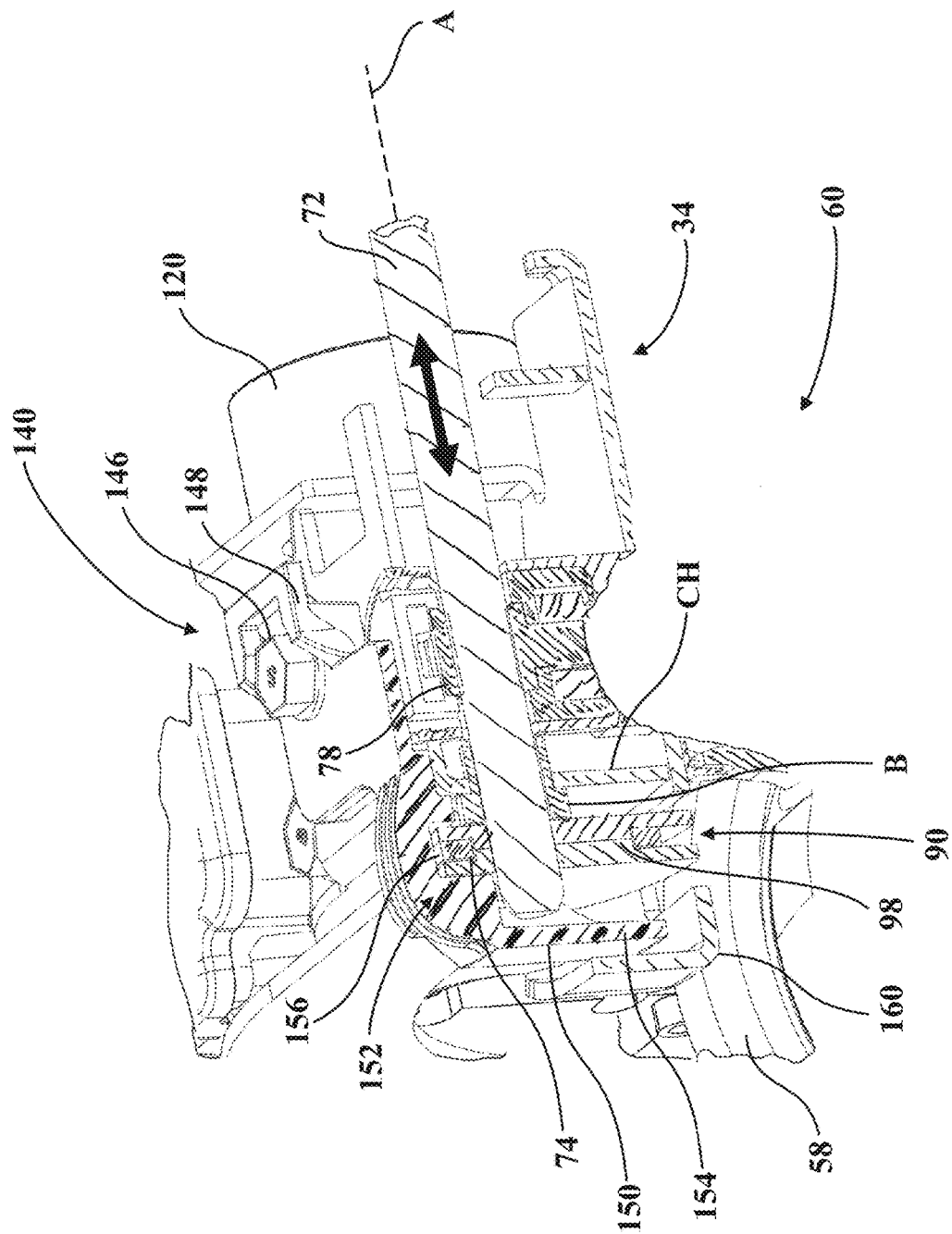
FIG. 13 is a cross-sectional, perspective view of the retainer cooperating with the linkage.

Referring to FIGS. 12A, 12B, and 13, retainers 140 are coupled to the support structure 32. The retainers 140 cooperate with the linkage 66 to limit and/or guide movement of the linkage 66. For instance, the retainers 140 limit longitudinal movement of the first links 72 and guide the sliding movement of the second links 74. Four retainers 140 are present in the version shown, but there may be more or fewer retainers in other versions. Only one of the retainers 140 will be described in detail.

As best shown in FIGS. 12A and 12B, each retainer 140 includes a locating post 142. The base 34 includes an opening 144 to receive the locating post 142 to orient the retainer 140 on the base 34 and relative to the linkage 66. A fastener 146 secures each retainer 140 to the base 34 at a location spaced from the locating post 142. The retainer 140 also includes a line manager or shield 148 under which an electrical cable or other form of conduit, cable, line, etc. can be placed for guiding/managing such lines.

As best shown in FIG. 13, each retainer 140 includes a stop 150 to engage one end of the first link 72 to limit movement of the first link 72. Each retainer 140 also includes a guide 152 to receive the second link 74 to limit and guide movement of the second link 74. The stop 150 includes a wall 154 arranged to limit longitudinal movement of the first link 72 by providing an abutment for the first link 72. The guide 152 defines a notch 156 to receive the second link 74 and allow sliding movement of the second link 74 in the notch 156 relative to the retainer 140. The sector gear 98 of the coupling link 90 operatively couples the first link 72 to the second link 74, and the notch 156 is shaped and arranged to receive the coupling link 90 and allow movement of the sector gear 98 within the notch 156 during operation of the linkage 66.

In the version shown, each retainer 140 includes a monolithic structure fixed to the base 34. In some versions, the stop 150 and guide 152 are integrally formed as one-piece of plastic material, and the retainer 140 may be formed by injection molding. The retainer 140 may be formed of other materials. The guide 152 is shaped with a top wall and side walls that form the notch 156 to straddle the second link 74 while still allowing for rotation of the sector gear 98. The retainer 140 also contains a pocket 157 (see FIG. 12B) with a profile to receive the first link 72. In some versions, the first links 72 are free to longitudinally slide in the caster housings CH of the base 34 (see FIG. 13) whereby the stops 150 at each end limit such sliding and prevent the first links 72 from falling out of the sector gears 98 of the coupling links 90. Each retainer 140 is configured to go into full compression with the base 34 in the event of an impact. The base 34 may include a bumper 160 at each of the head end and foot end. The bumpers 160 are located to shield the retainers 140 from impact. The bumpers 160 may be formed of sheet metal or other suitable materials.

Figure 14:
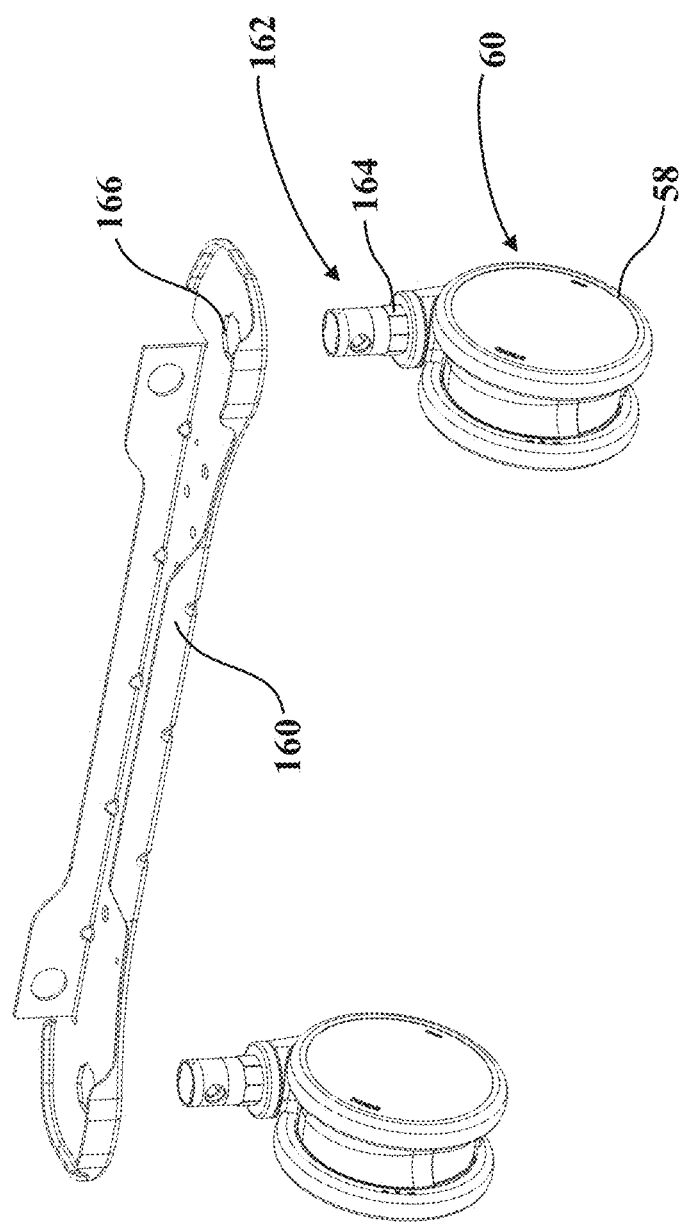
FIG. 14 is a partially exploded, perspective view illustrating connection of caster stems to a bumper, the caster stems having an octagonal feature.
Figure 15:
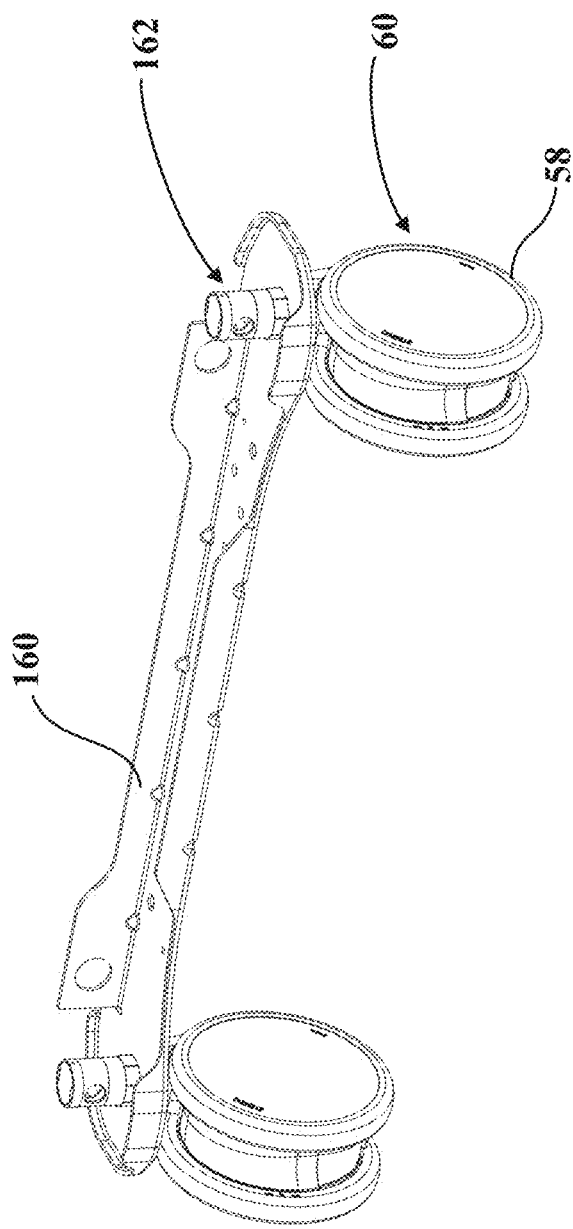
FIG. 15 is a perspective view illustrating the caster stems connected to the bumper.

As shown in FIGS. 14 and 15, each of the casters 60 includes a caster stem 162 coupled to one of the plurality of wheels 58 (or multiple wheels for dual-wheeled casters). The caster stem 162 includes a non-circular interface 164 and the bumper 160 includes mating openings 166 shaped to receive the non-circular interfaces 164 of the caster stems 162 and limit rotation of the caster stems 162 relative to the bumper 160. The bumper 160 may be reinforced (e.g., thicker, ribbed, etc.) at the openings 166 to further support the caster stems 162. In some versions, the non-circular interface 164 includes an octagonal feature at a base of the caster stem 162 that mates into a corresponding octagonal opening in the bumper 160 to prevent rotation of the caster stems 162 relative to the base 34. Other rotation-limiting shapes are also possible.

Figure 16:
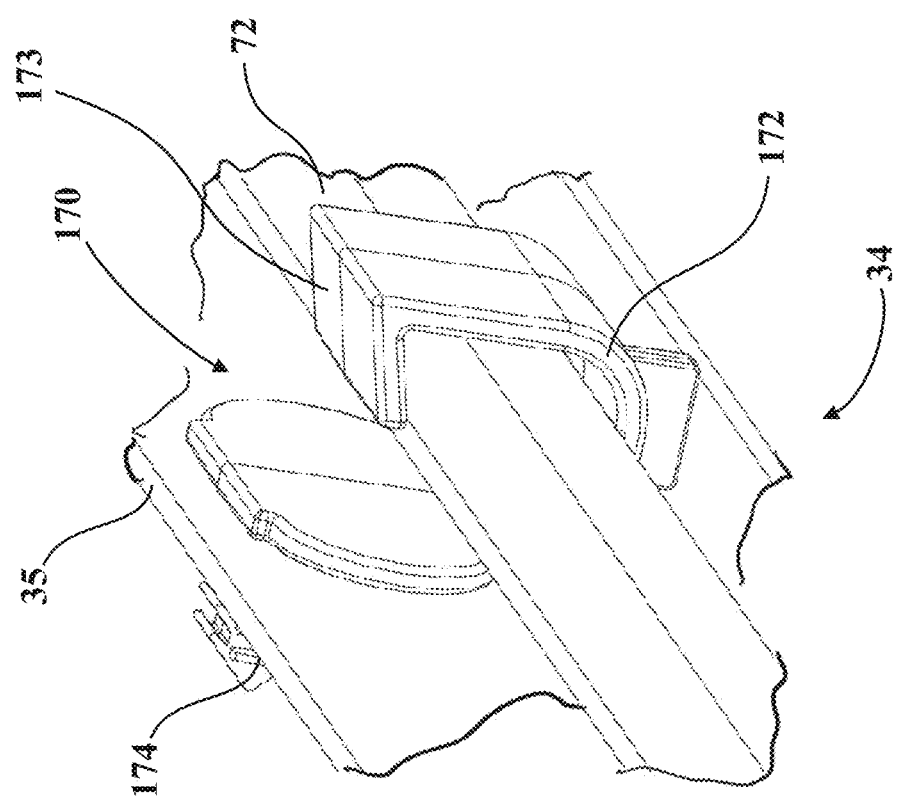
FIG. 16 is a perspective view illustrating a link support supporting a first link.
Figure 17:
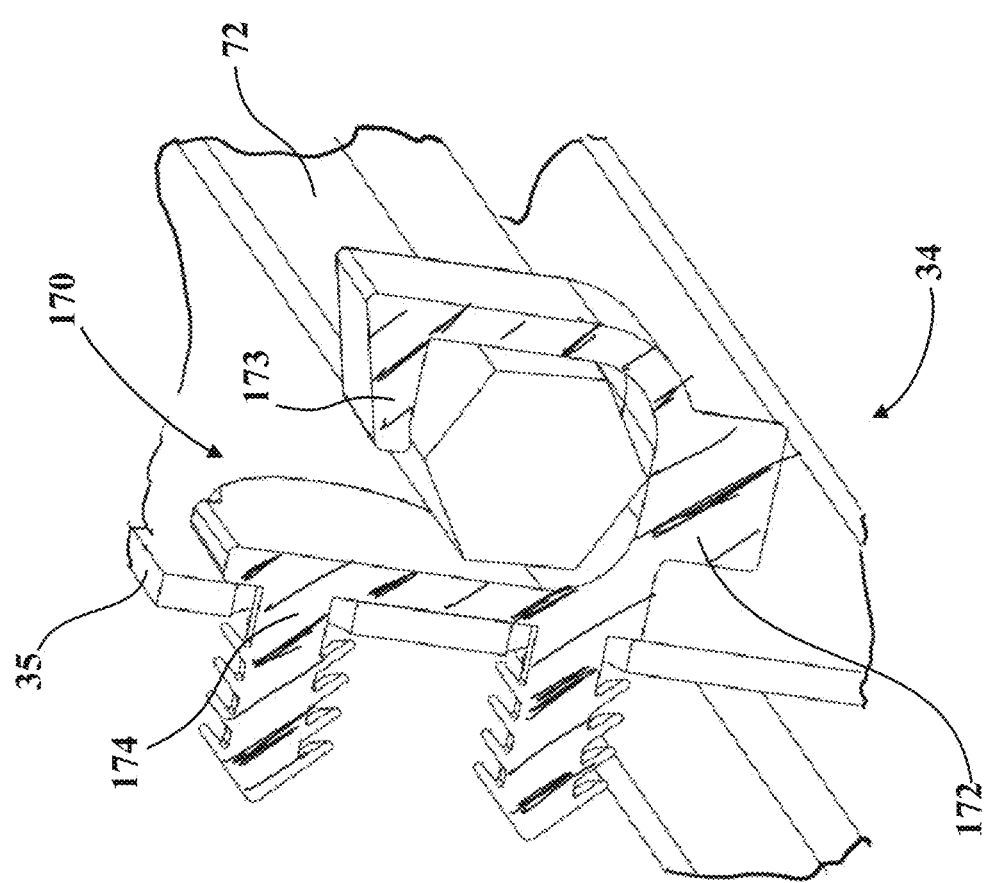
FIG. 17 is a cross-sectional, perspective view illustrating the link support supporting the first link.

Referring to FIGS. 16 and 17, link supports 170 are mounted to the base 34 to rotatably support the first links 72 (one for each of the first links 72). This helps to prevent sagging and rattling of the first links 72 against the base 34 since the first links 72 span longitudinally from one end of the patient transport apparatus 30 to the other end. Each link support 170 may be formed in one-piece of plastic and shaped to capture the first link 72 and space the first link 72 away from the base 34. The link support 170 may have a receiving portion 172 and an attachment portion 174. The receiving portion 172 is C-shaped and substantially surrounds an outer perimeter of the first link 72. The receiving portion 172 may also have a capturing tab 173 that flexes when the receiving portion 172 is being fitted to the first link 72 and prevents the first link 72 from easily popping out of the receiving portion 172. The attachment portion 174 may have fasteners (e.g., christmas tree connectors, screws, pins, clips, or other suitable fasteners) to attach to the base 34 via one or more openings in members of the base frame 35.

Figure 18A:
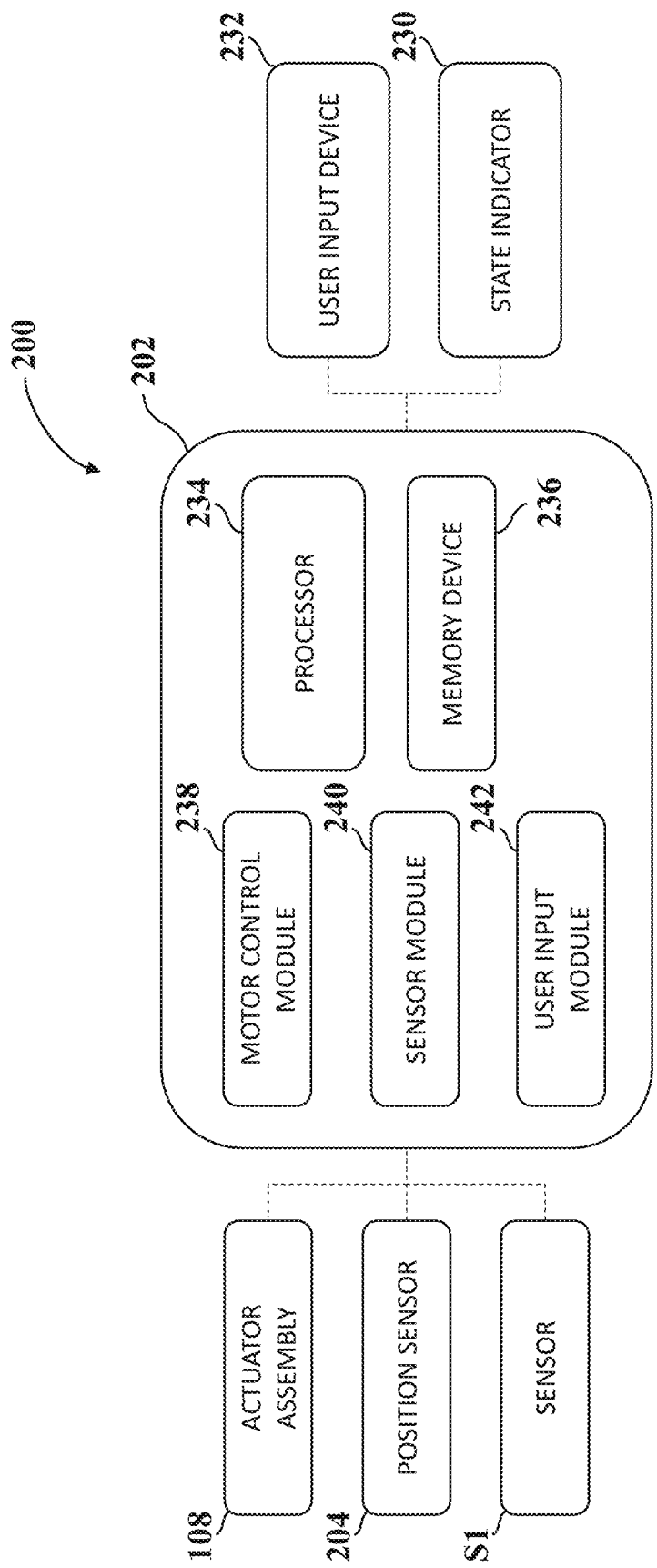
FIG. 18A is a block diagram of components of the electro-mechanical braking system.

Referring to FIG. 18A, in the illustrated version, the patient transport apparatus 30 includes a control system 200 to control operations of the electro-mechanical braking system 64. The control system 200 includes the controller 202 having one or more microprocessors, microcontrollers, field programmable gate arrays, systems on a chip, discrete circuitry, and/or other suitable hardware, software, or firmware that is capable of carrying out the functions described herein. The controller 202 may be carried on-board the patient transport apparatus 30 or may be remotely located. In one version, the controller 202 is mounted to the base 34. In other versions, the controller 202 is mounted to the footboard 54. Power to the electrical braking assembly 70 and/or the controller 202 may be provided by a battery power supply and/or an external power source. The controller 202 is coupled to the electrical braking assembly 70 in a manner that allows the controller 202 to control the actuator assembly 108 (connections shown schematically in FIG. 18A). The controller 202 may communicate with the actuator assembly 108 via wired or wireless connections to perform one of more desired functions.

The control system 200 also includes a position sensor 204 coupled to the controller 202 that is responsive to operation of the linkage 66 to determine the current state of the linkage 66. The position sensor 204 may be mounted to the brakes 62 for sensing a position of the brakes 62. The position sensor 204 may also be coupled to the actuator assembly 108 and configured to measure rotations of the motor 120. The position sensor 204 could also be mounted to the manual actuation shaft 100 and/or the brake pedal 102 to determine a position of the brake pedal 102 and correlate these positions to the braked state, released state, or steer locked state. In the version shown in FIGS. 19 and 21, the position sensor 204 includes a pair of limit switches 206a, 206b that are mounted to a circuit board 208 fixed to the base 34.

Referring, generally, to FIGS. 19-24, a sensor actuator 210 is coupled to the linkage 66 to move with the linkage 66 between the braked state, released state, and/or the steer locked state. The sensor actuator 210 has an actuating head 212 supported by the support structure 32 for sliding movement relative to the limit switches 206a, 206b and an engagement interface 214 carried by the linkage 66 to move with the linkage 66. In the representative version illustrated herein, the engagement interface 214 is realized as a slidable element (or a "slider") as described in greater detail below. However, it will be appreciated that other configurations are contemplated. The engagement interface 214 includes a button connector 216 that fits into a corresponding notch 217 in the second link 74 (see FIG. 10) so that sliding of the second link 74 causes corresponding sliding of the engagement interface 214. The button connector 216 has a stem that fits into the notch 217 in the second link 74 and a head that retains the stem in the notch 217.

Figure 19:
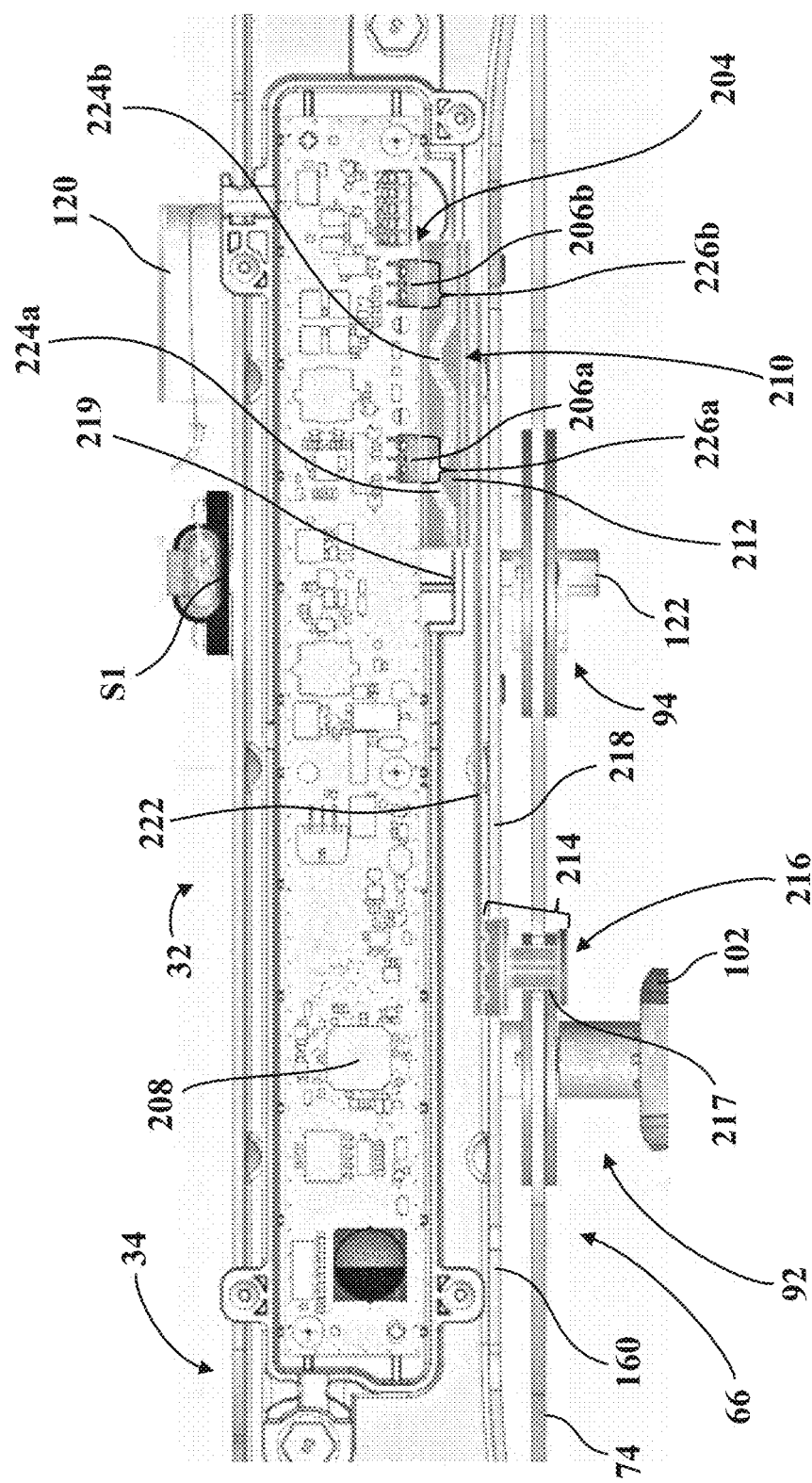
FIG. 19 is a top view of a sensor actuator coupled to the linkage and to the bumper.
Figure 20:
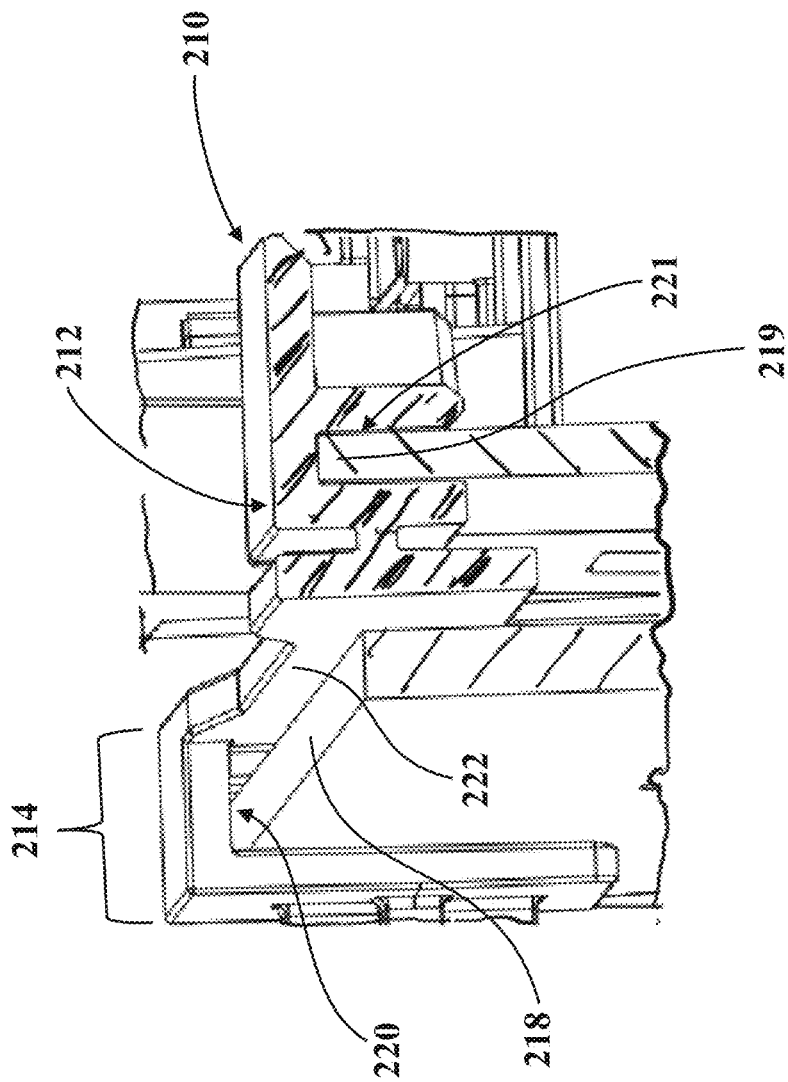
FIG. 20 is a cross-sectional, perspective view illustrating tracks that straddle a bumper guide rail and head guide rail.

As shown in FIGS. 19 and 20, the bumper 160, which forms part of the support structure 32, includes a bumper slide rail 218. The engagement interface 214 defines a first track 220 to straddle and ride along the bumper slide rail 218. An electronics enclosure is fixed to the bumper 160 and includes a head slide rail 219 located at a spaced distance from the bumper slide rail 218. The head slide rail 219 is fixed in position relative to the bumper slide rail 218. The actuating head 212 defines a second track 221 to straddle and ride along the head slide rail 219.

The sensor actuator 210 includes one or more flexible connectors 222 interconnecting the actuating head 212 and the engagement interface 214 so that the actuating head 212 is flexibly connected to the engagement interface 214 to adjust a distance between the actuating head 212 and the engagement interface 214. More specifically, the one or more flexible connectors 222 are flexible to adjust to a distance between the bumper slide rail 218 and the head slide rail 219 to account for manufacturing tolerances in different patient transport apparatuses 30. For example, large tolerances may be specified for manufacture of the bumpers 160, which will result in variations in distances between the bumper slide rail 218 and the head slide rail 219 among different patient transport apparatuses 10 made by the same manufacturer. The one or more flexible connectors 22 are provided to account for such variations.

In some versions, the sensor actuator 210 is formed of plastic (e.g., via injection molding) and the flexible connectors 222 include one or more thin strips of plastic that allow for flexing of the sensor actuator 210. For example, in the version shown in FIGS. 22-24, the flexible connector 222 includes a flexible leg that extends from the actuating head 212 to the engagement interface 214. Alternatively, the actuating head 212 may be coupled to the engagement interface 214 by other resilient members, e.g., springs, rubber connectors, etc., or any other suitable flexible features.

Figure 21:
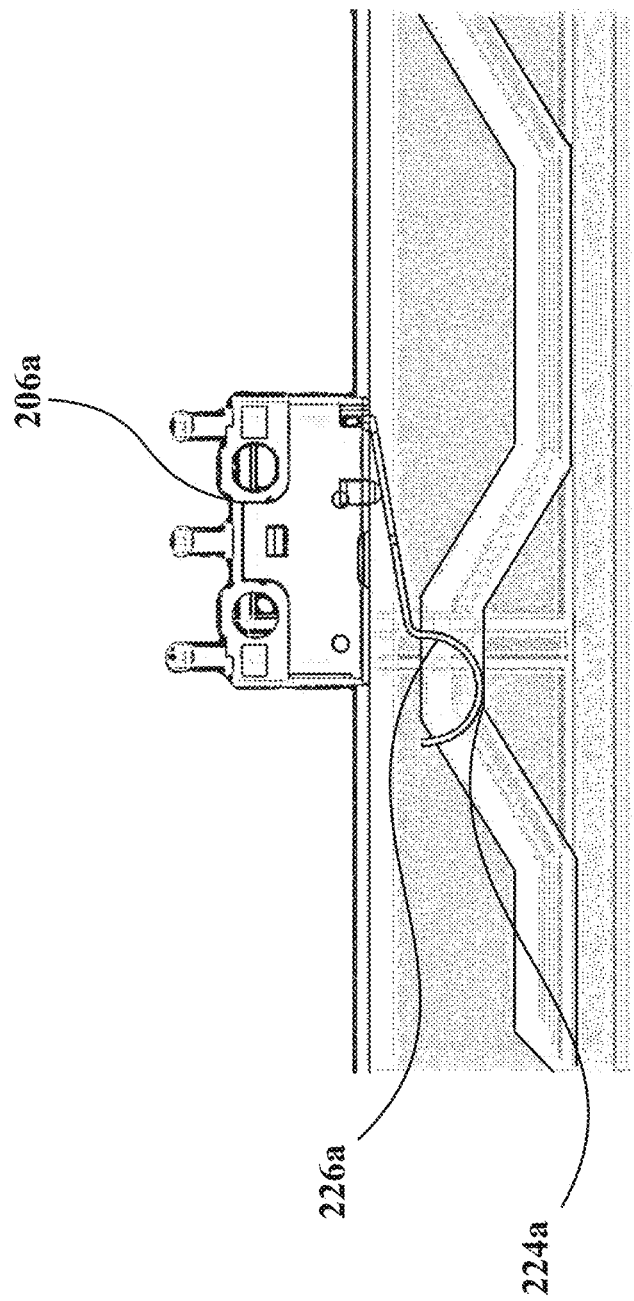
FIG. 21 is top view of a switch engaged by the sensor actuator.
Figure 22:
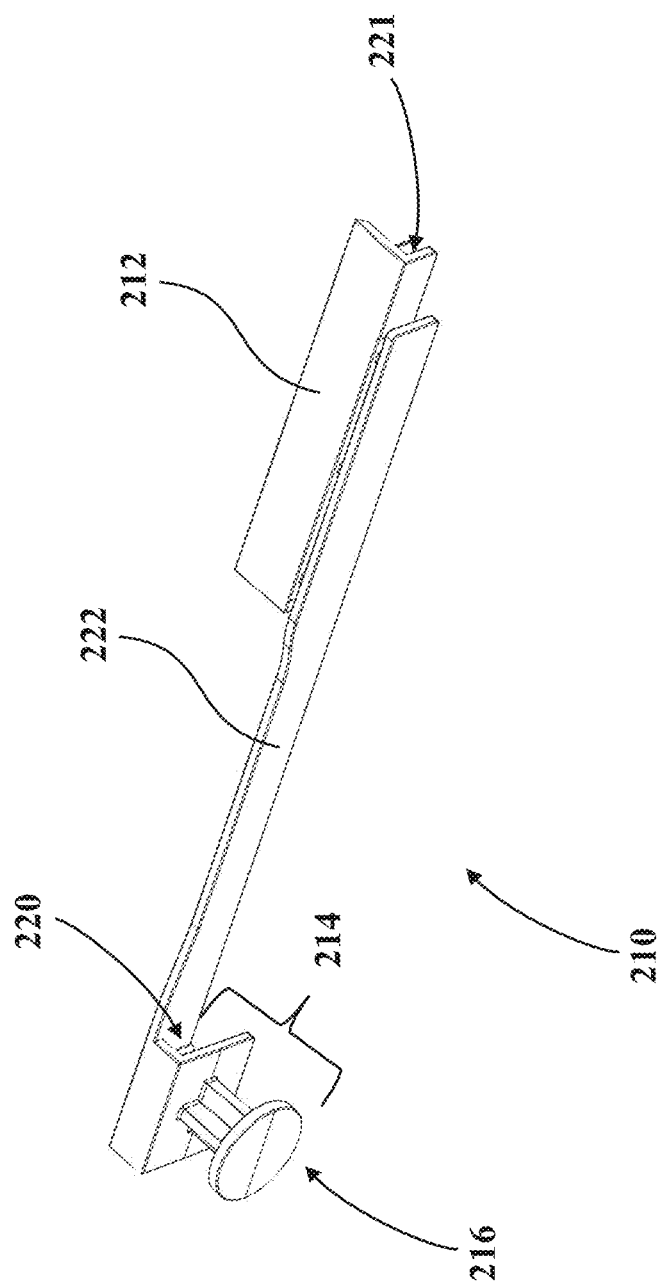
FIG. 22 is a perspective view of the sensor actuator.
Figure 23:
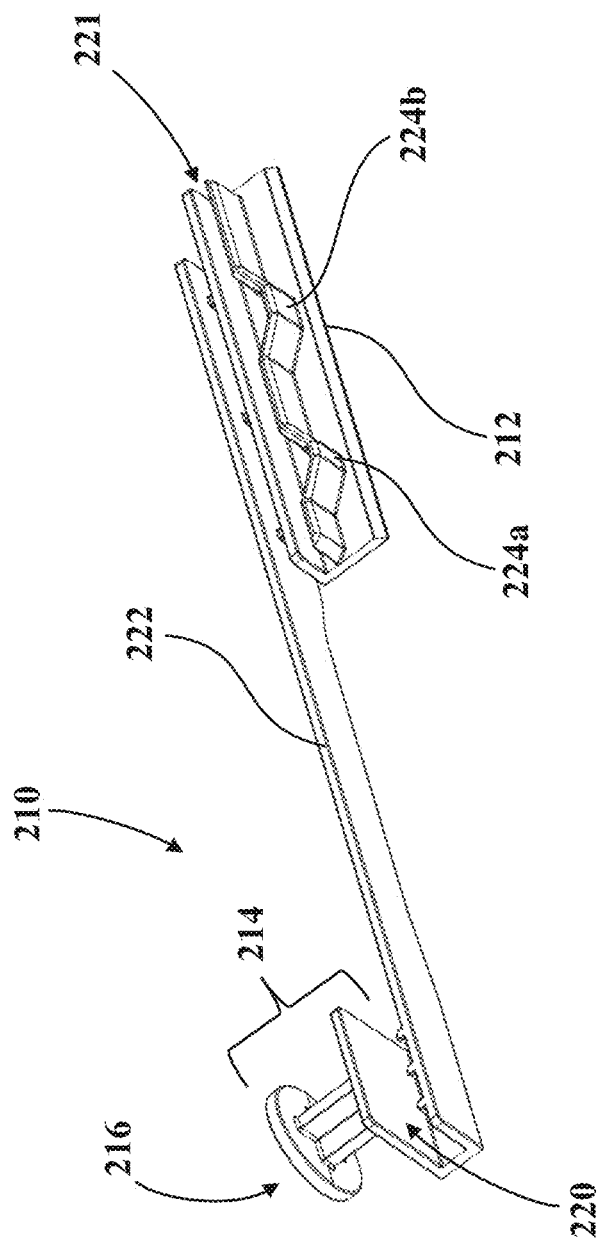
FIG. 23 is another perspective view of the sensor actuator.
Figure 24:
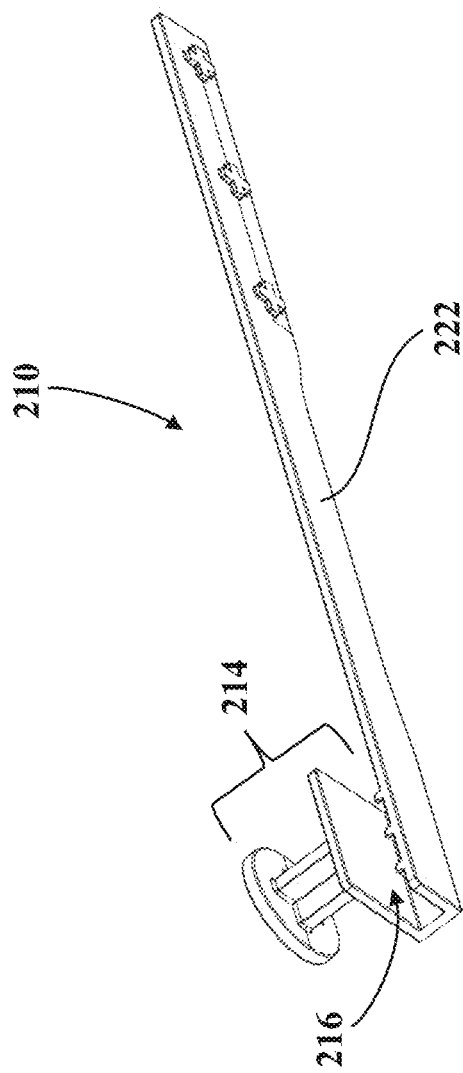
FIG. 24 is a cross-sectional, perspective view illustrating connectors for an actuating head of the sensor actuator.

As best shown in FIGS. 19 and 23, the actuating head 212 includes a plurality of cams, e.g., first and second cams 224a, 224b, to engage first and second arms 226a, 226b of the limit switches 206a, 206b. In the released state (neutral state), as shown in FIGS. 19 and 21, the first cam 224a engages the first arm 226a to activate the associated limit switch 206a, while the second arm 226b remains out of contact with the second cam 224b. When moving to the braked state from the released (or neutral) state, the engagement interface 214 is moved by virtue of the movement of the second link 74, and the first cam 224a slides to the right out of contact with the first arm 226a, while the second cam 224b slides into contact with the second arm 226b to activate the associated limit switch 206b. When moving to the steer locked state from the released (or neutral) state, the engagement interface 214 is moved by virtue of the movement of the second link 74, and the first cam 224a slides to the left out of contact with the first arm 226a, while the second cam 224b continues to be out of contact with the second arm 226b. Thus, the different activation states of the limit switches 206a, 206b enables the controller 202 to determine the current state of the linkage 66.

In some cases, during assembly, it may be difficult to precisely locate the cams 224a, 224b so that the cams 224a, 224b engage the arms 226a, 226b exactly when the electromechanical braking system 64 changes states, e.g., when the brakes 62 are fully engaged or fully released. As a result, if one of the arms 226a, 226b are prematurely contacted, i.e., before a state change actually occurs, then the controller 202 may falsely detect that a state change has occurred, and otherwise cease operation of the actuator assembly 108 before the state change is actually finished, possibly leaving the electro-mechanical braking system 64 in an undesirable state. To avoid incomplete state changes, the controller 202 may be programmed to sample the signals from the limit switches 206a, 206b for a period of time beyond contact of the arms 226a, 226b by the cams 224a, 224b to ensure complete changes in state, e.g., complete activation/deactivation of the brakes 62. For example, with a sample size of 2 and a frequency of 5 ms when the second cam 224b initially slides into contact with the second arm 226b to activate the associated limit switch 206b, the controller 202 recognizes this activation and continues sampling the signals from the limit switch 206b for 10 ms so that the controller 202 continues to drive the motor 120 slightly beyond the activation point (by virtue of reading an active signal for a longer period of time) to ensure the electro-mechanical braking system 64 is in the desired state at which point the motor drive 120 is stopped.

Referring back to FIG. 18A, the control system 200 also includes a state indicator 230 that is coupled to the controller 202. The controller 202 is configured to operate the state indicator 230 to indicate the sensed state of the electromechanical braking system 64. The state indicator 230 may include one or more visual indicators, audible indicators, and/or tactile indicators to indicate the sensed state. The state indicator 230 may be coupled to the manual brake pedal 102, the base 34, the side rails 44, 46, 48, 50, the headboard or 52 or footboard 54, or any part of the patient transport apparatus 30.

The control system 200 may include a user interface U1 with one or more user input control devices 232 that are operated by the caregiver, and which transmit a corresponding input signal to the controller 202. In some configurations, the user interface U1 is a panel operatively attached to the support structure 32. The controller 202 controls operation of the actuator assembly 108 based on the input signal. The user input control devices 232 may include any device capable of being actuated by the caregiver. The user input control devices 232 may be configured to be actuated in a variety of different ways, including but not limited to, mechanical actuation (hand, foot, finger, etc.), hands-free actuation (voice, foot, etc.), and the like.

The user input control devices 232 may also include a gesture sensing device for monitoring motion of hands, feet, or other body parts of the caregiver (such as through a camera), a microphone for receiving voice activation commands, a foot pedal, and a sensor (e.g., infrared sensor such as a light bar or light beam to sense a caregiver's body part, ultrasonic sensor, etc.). Additionally, the user input control devices 232 may include buttons/pedals can be physical buttons/momentary buttons/pedals or virtually implemented buttons/pedals such as through optical projection or on a touchscreen.

The buttons/pedals may also be mechanically connected or drive-by-wire type buttons/pedals where a caregiver applied force actuates a sensor, such as a switch or potentiometer. It should be appreciated that any combination of user input control devices 232 may also be utilized. The user input control devices 232 may be located on one of the side rails 44, 46, 48, 50, the headboard 52, the footboard 54, or other suitable locations. The user input control devices 232 may also be located on a portable electronic device (e.g., iWatch®, iPhone®, iPad®, or similar electronic devices).

In the illustrated version, the controller 202 includes a processor 234 and a memory device 236. Processor 234 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 236 includes a computer readable medium, such as, without limitation, random access memory (RAM), flash memory, a hard disk drive, a solid state drive, a diskette, a flash drive, a compact disc, a digital video disc, and/or any suitable device that enables processor 234 to store, retrieve, and/or execute instructions and/or data.

In the exemplary version, the controller 202 includes a motor control module 238 that is coupled to the actuator assembly 108 to control an operation of actuator assembly 108. The motor control module 238 is configured to execute programming code in response to inputs received by the caregiver via the user interface to operate the actuator assembly 108 based on the user input. In addition, controller 202 also includes a sensor module 240 that is coupled to at least one sensor such as, for example, the sensor S1 and the position sensor 204. The sensor module 240 is configured to received data from the sensors and transmit the received sensor data to the motor control module 238 to facilitate operating the electrical braking assembly 70. Each sensor may transmit a signal continuously, periodically, or only once and/or any other signal timing that enables the controller 202 to function as described herein. Moreover, each sensor may transmit a signal either in an analog form or in a digital form.

The controller 202 also includes a user input module 242 that is configured to receive input signals from the user input control devices 232 and/or to generate and display images for display on one or more display devices of the user interface. For example, the user input module 242 may retrieve image data being stored in the memory device 236 and transmit the image data to the user interface to enable one or more display devices to display the images to the caregiver. The user input module 242 also transmits signals to the state indicator 230 to operate the state indicator 230 to indicate the sensed state.

During operation of the electrical braking assembly 70, when a caregiver wishes to engage or release the brakes 62, the caregiver actuates one or more of the user input control devices 232. For instance, in the event the caregiver wishes to brake the wheels 58 to stop movement of the patient transport apparatus 30, the caregiver actuates the appropriate user input control device 232. Upon actuation, the controller 202 sends output signals to the actuator assembly 108 to cause operation of the actuator assembly 108 to move accordingly. Similarly, one or more of the user input control devices 232 can be used to release the brakes 62, or to place the electro-mechanical braking system 64 in the steer locked state.

Figure 18B:
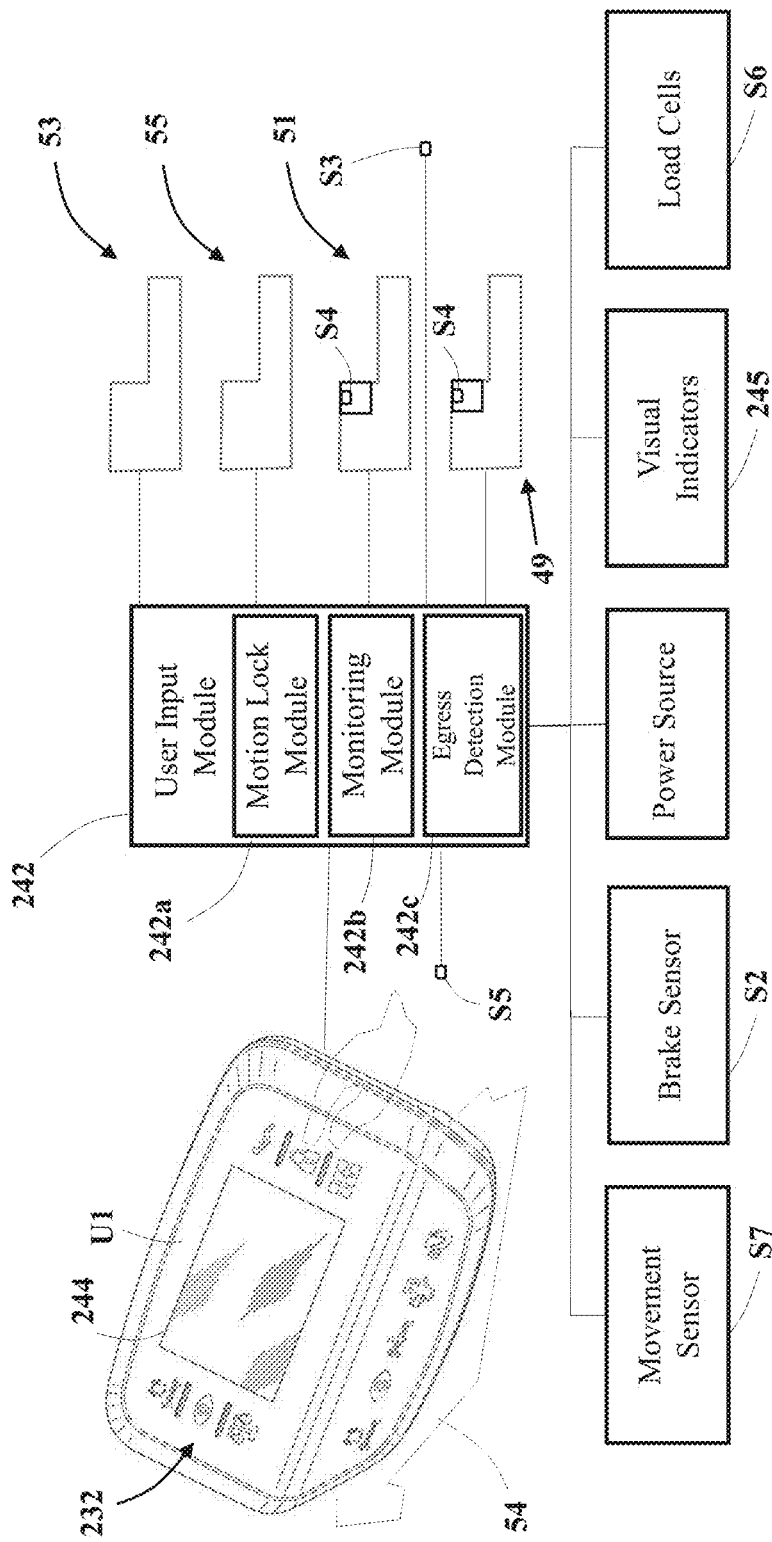
FIG. 18B is a block diagram of a user input module for the patient support apparatus.

Referring now to FIG. 18B, the user input control devices 232 on the user interface U1 include buttons disposed about a display 244 that activate sensors (e.g., switches) coupled to the controller 202, as well as a capacitive touchscreen integrated with the display 244. The touchscreen provides buttons (virtual) for actuation by the user in one or more user menus. The display 244 may be an LCD, LED, OLED, or similar type of electronic display.

The user input module 242 may include a motion lock module 242a that allows the user to limit (or lock out) operation of certain features of the patient transport apparatus 30, to prevent the patient or others from operating such features.

The user input module 242 may include a monitoring module 242b configured to set a desired state of and/or monitor a plurality of powered function conditions of a plurality of powered devices of the patient transport apparatus 30. The plurality of powered devices (e.g., lift actuators 53, 55, deck actuators 49, 51, etc.) are disposed in communication with the controller and may be operable between an activated mode to perform one or more powered functions of the patient transport apparatus 30, and a deactivated mode. In some configurations, the operation of the one or more powered devices in the deactivated mode is one of the plurality of powered function conditions that is set and/or monitored by the monitoring module 242b.

The monitoring module 242b may control one or more visual indicators 245 (and/or other indicators, such as audible and tactile indicators) to indicate when the patient transport apparatus 30 is in an undesired configuration in response to detecting one or more of the plurality of powered function conditions being in an undesired state. This provides an alert/alarm to caregivers of the patient. In some configurations, the monitoring module 242b may generate a system status signal representing one or more powered function conditions of the patient transport apparatus 30. The monitoring module 242b forms part of a software program operable by the controller 202 and includes executable code to be executed by one or more processors of the controller 202. The monitoring module 242b may operate like the system disclosed in U.S. Pat. No. 10,791,966, entitled "Patient Handling Device Including Local Status Indication, One-Touch Fowler Angle Adjustment, And Power-On Alarm Configuration," incorporated herein by reference.

The plurality of powered function conditions to be set and monitored by the monitoring module 242b may include, for example, a brake condition that can be sensed by a brake sensor S2 (e.g., braked or unbraked), a back section angle condition that can be sensed by an angle sensor S3 (e.g., the back section 41 is at 30-degrees or higher or below 30-degrees), a height condition that can be sensed by sensors S4 in the lift actuators 53, 55 (e.g., at the low height position or not at the low height position), a side rail condition that can be sensed by one or more side rail sensors S5 (e.g., raised or not raised), an egress detection condition that can be sensed by load cells S6 (e.g., patient in bed or not in bed), a patient transport apparatus movement condition that can be sensed by movement sensor S7 (e.g., a sensor located on base 34 to detect movement of the patient transport apparatus 30 relative to the floor), and the like. In some versions, aspects of the patient transport apparatus 30 may be similar to as is described in International Patent Application Publication No. WO 2021/242946 A1, entitled "Lift Systems And Load Cells For Patient Support Apparatus;" International Patent Application Publication No. WO 2021/108377, entitled "Patient Support Apparatus With Load Cell Assemblies;" and/or U.S. Patent Application Publication No. US 2021/0030611 A1, entitled "Patient Support Apparatus With Load Cell Assemblies;" the disclosures of each of which are hereby incorporated by reference in their entirety. Other configurations are contemplated.

The user input module 242 may also include an egress detection module 242c configured to detect when the patient exits the patient support deck 38 or moves too far away from a center of gravity of the patient support deck 38. Furthermore, the load cells S6 may be utilized to predict an egress detection condition before it occurs. The egress detection module 242c controls one or more of the visual indicators 245 to alarm in response to detecting the patient exiting the patient support deck 38 or moving too far away from the center of gravity of the patient support deck 38. The egress detection module 242c may be operable between an activated mode to determine patient egress from the patient support deck 38 and a deactivated mode. In some versions, operation of the egress detection module 242c in the deactivated mode is one of the plurality of powered function conditions monitored by the monitoring module 242b. The egress detection module 242c forms part of a software program operable by the controller 202 and includes executable code to be executed by one or more processors of the controller 202. The egress detection module 242c may operate like the system disclosed in U.S. Pat. No. 10,791, 966, entitled "Patient Handling Device Including Local Status Indication, One-Touch Fowler Angle Adjustment, And Power-On Alarm Configuration," incorporated herein by reference. In some versions, aspects of the patient transport apparatus 30 may be similar to as is disclosed in U.S. Pat. No. 9,539,156, entitled "Hospital Bed;" U.S. Pat. No. 10,617,327, entitled "Exit Detection System With Compensation;" and/or U.S. Pat. No. 10,786,408, entitled "Person Support Apparatuses With Exit Detection Systems;" the disclosures of each of which are hereby incorporated by reference in their entirety. Other configurations are contemplated.

Figure 25:
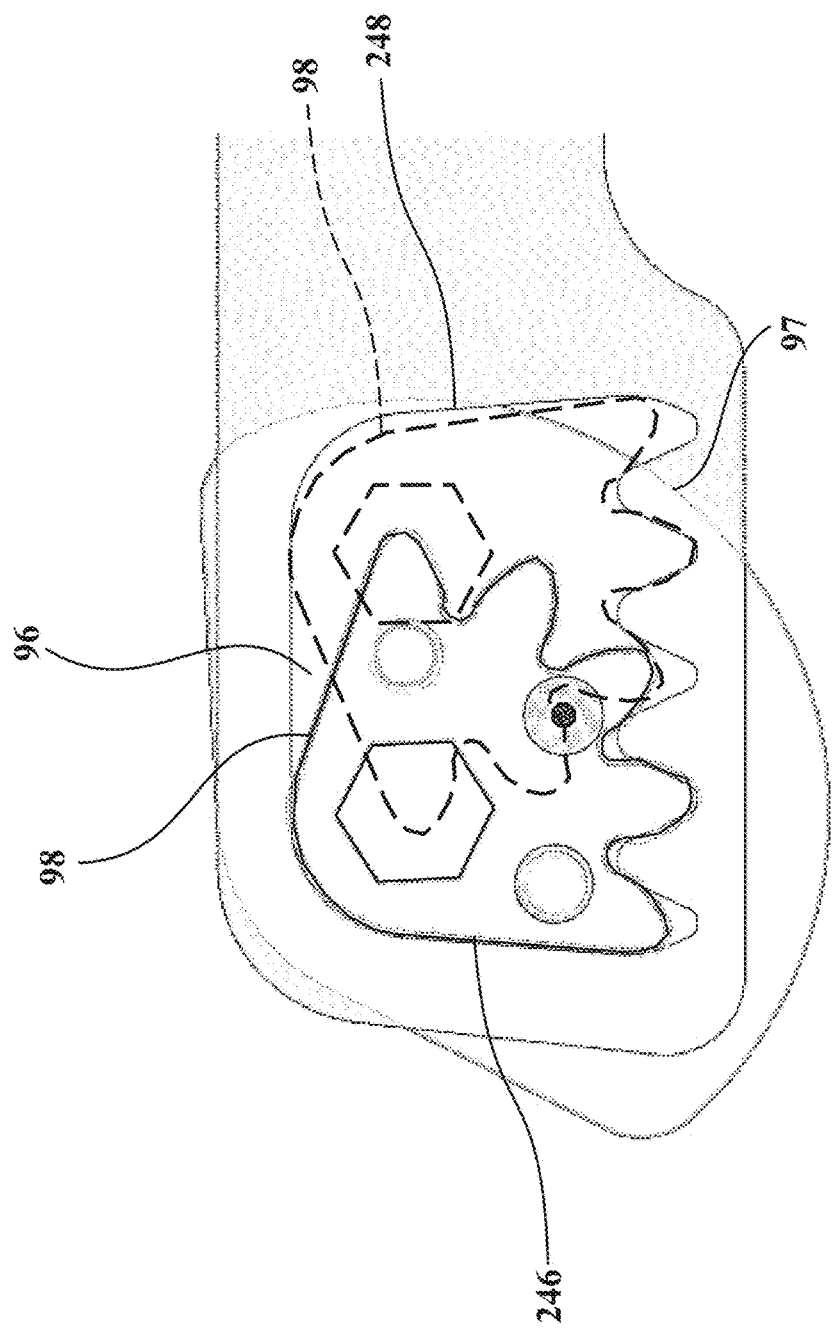
FIG. 25 is an illustration of a sector gear reaching hard stop limits in an elongated slot.
Figure 26:
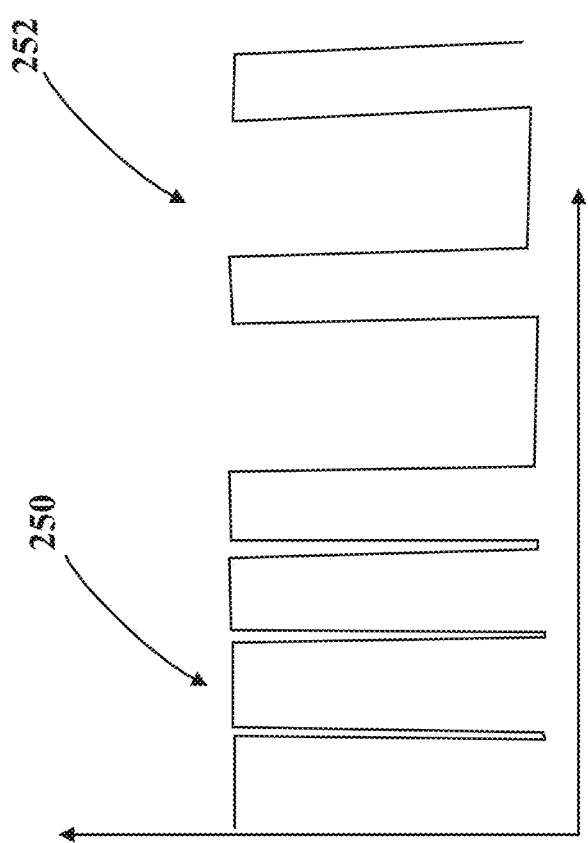
FIG. 26 is a graph of duty cycles over time for a control scheme of the electro-mechanical braking system.

Referring to FIG. 25, in some versions, the actuator assembly 108 is driven to a maximum limit by intentionally reaching a hard stop of one or more of the sector gears 98. The hard stop may be provided by the sector gear 98 making hard contact against sides 246, 248 of one or more of the engagement slots 96, i.e., hard contact with a wall of the second link 74 (which, like the sector gears 98, can be formed of metal). For example, the motor 120 drives the linkage 66 until one of the sector gears 98 bears against one of the sides 246, 248 of its corresponding engagement slot 96 as illustrated in FIG. 25, i.e., there is no further travel available for the sector gear 98 in the engagement slot 96. This allows maximum movement of the linkage 66 without any hard stops within the caster assemblies 60 (which can otherwise damage the caster assemblies 60). However, when operating at a high speed and torque, consistently hard stopping the sector gear 98 against the sides 246, 248 of the engagement slot 96 could cause damage to the sector gear 98, the driving member 106, or other components. As a result, it may be desired to reduce the operating speed and/or torque of the motor 120, but this may sacrifice time for engaging or disengaging the brakes 62, for example. Accordingly, referring to FIG. 26, in one version, the controller 202 may initially drive the motor 120 at a first duty cycle 250, e.g., at a 95% duty cycle, using pulse width modulation to move the linkage 66 toward one of the desired states. However, when the electro-mechanical braking system 64 detects that the linkage 66 is nearing the braked state (or starts entering the braked state), for example, the controller 202 instantly begins ramping down the duty cycle to a second duty cycle 252, e.g., a 25% duty cycle.

Nearing (or entering) the braked state can be sensed with the position sensor 204 or other suitable sensor (such as a SPDT switch), which can provide input to the controller 202 to control the motor 120 accordingly. For example, initial activation of the limit switch 206b could indicate nearing (or entering) the braked state and trigger such a change in motor control. Once movement toward the braked state is initially sensed, the linkage 66 can be moved further to ensure full engagement of the brakes 62. For example, the controller 202 may cause the motor 120 to drive for an additional period of time until the hard stop of the sector gear 98 is reached, such as one second, or other suitable time. The hard stop can be sensed by monitoring motor current and detecting a spike in the current associated with such a hard stop. However, by reducing the duty cycle before reaching the hard stop, the associated current and corresponding torque when the hard stop is ultimately reached can be reduced. In some cases, the reduction from the first duty cycle 250 to the second duty cycle 252 can result in a reduction in current associated with the hard stop of from about 6 A to 1.5 A, and an effective reduction in output torque associated with the hard stop of more than 50%.

Referring now, generally, to FIGS. 27-30B, aspects of a control scheme 260 of the electro-mechanical braking system 64 are generally shown according to the present disclosure. As noted above, during operation of the electrical braking assembly 70, when a caregiver wishes to engage or release the brakes 62, the caregiver actuates one or more of the user input control devices 232. For instance, in the event the caregiver wishes to brake the wheels 58 to stop movement of the patient transport apparatus 30, the caregiver actuates the appropriate user input control device 232. Upon actuation, the controller 202 sends output signals to the actuator assembly 108 to cause operation of the actuator assembly 108 to move accordingly. Similarly, one or more of the user input control devices 232 can be used to release the brakes 62, or to place the electro-mechanical braking system 64 in the steer locked state.

Here, engagement of the user input device 232 generates a signal that can be fed to a redundant circuit 262 interposed between the controller 202 and the electrical braking assembly 70 that allows operation of the electrical braking assembly 70 to occur. In some versions, actuation of the user input control device 232 results in the generation of a momentary ON signal. Here, when this type of momentary ON signal is generated, there may be insufficient time for the redundant circuit 262 to allow operation of the braking assembly 70. In order to rectify this, the control scheme 260 employs a brake control circuit 264. The brake control circuit 264 is interposed between the controller 202 and the user interface U1 to drive the actuator assembly 108 in response to user engagement with the input control device 232. The brake control circuit 264 includes a hold circuit 266. In the illustrated version, the hold circuit 266 is realized as a type of resistor capacitor charge discharge circuit. However, as will be appreciated from the subsequent description below, other types of hold circuit 266 may be utilized, such as 555 timers, microcontrollers, other types of integrated circuits, and the like.

The hold circuit 266 generates an enable signal with a predetermined voltage in response to the user engagement with the user input control device 232. The hold circuit 266 may then maintain the enable signal for a predetermined period following user disengagement with the user input control device 232. The hold circuit 266 may then operate the actuator assembly 108 with the enable signal to move the driving member 106 between the first position and the second position within the predetermined time period.

In some configurations, both the hold circuit 266 and the redundant circuit 262 are utilized. The redundant circuit 262 allows operation of the electrical braking assembly 70 to occur only in response to simultaneously receiving both the enable signal generated from engagement with the user input device 232 of the user interface U1 via the hold circuit 266, and the system status signal generated by the controller 202 (e.g., from the monitoring module 242b of the user input module 242 or other components of the control system 200) so as to prevent inadvertent or improper operation of the electrical braking assembly 70.

In this configuration, the enable signal may be prohibited from operating the electrical braking assembly 70 unless or until certain system conditions are met, as indicated by the system status signal. By way of example and not limitation, the operation of the egress detection module 242c in an activated mode may contraindicate certain operations of the electrical braking assembly 70 (e.g., disengagement of brakes 62 may not be recommended when egress detection and monitoring is active). Similarly, the operation of certain powered devices (e.g., lift actuators 53, 55, deck actuators 49, 51, etc.) in an activated mode may contraindicate certain operations of the electrical braking assembly 70 (e.g., disengagement of brakes 62 may not be recommended while lift or deck actuators are in motion).

Figure 28:
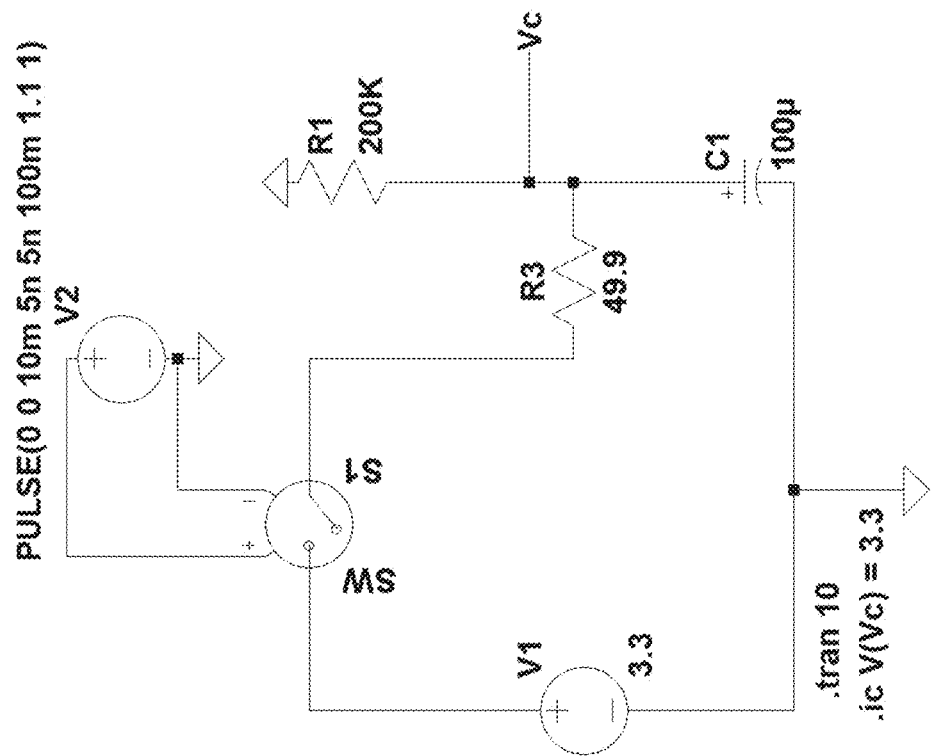
FIG. 28 is a schematic representation of one version of a charge discharge circuit for the control scheme of FIG. 27.
Figure 29A:
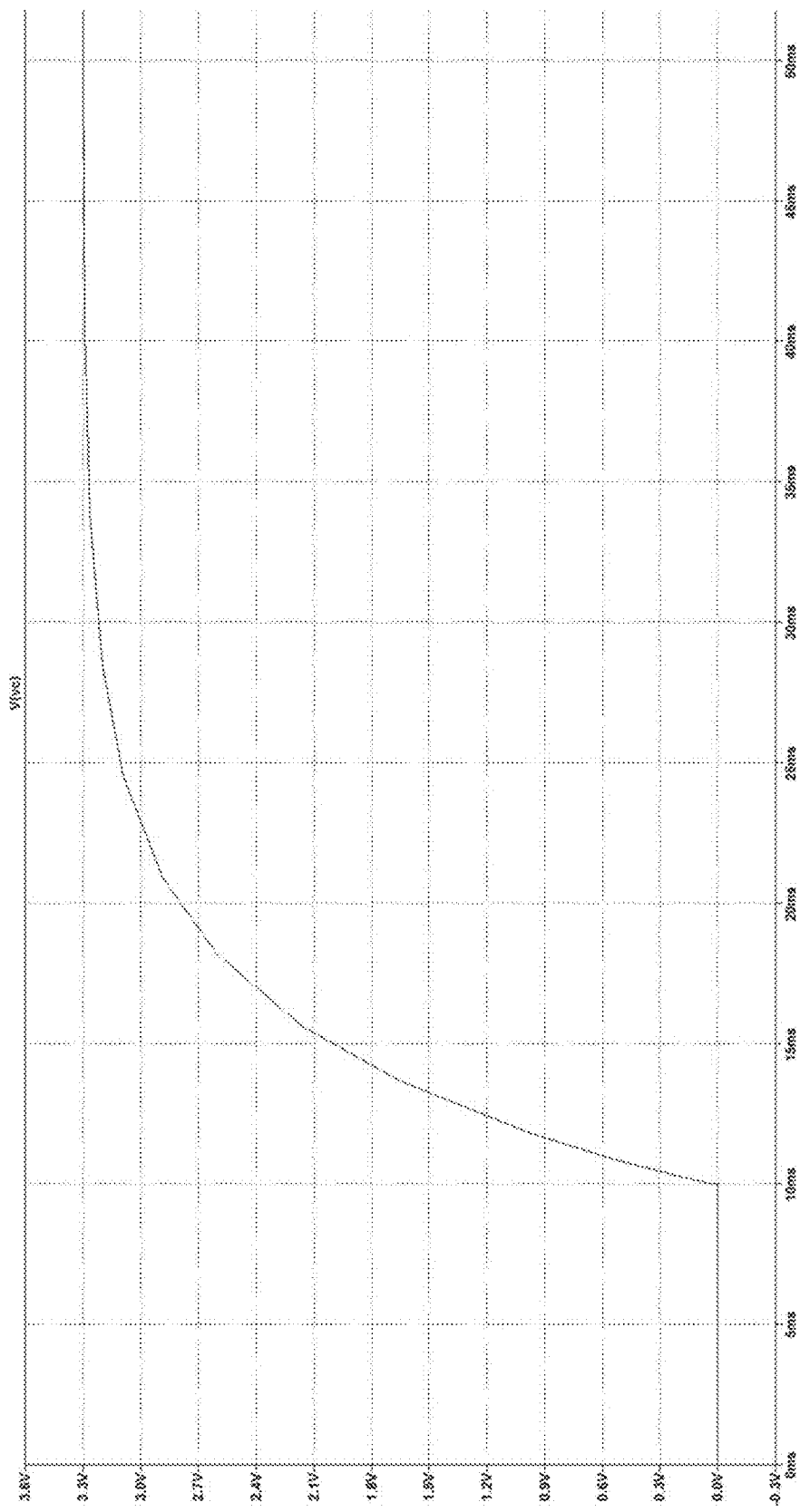
FIG. 29A is a graphical representation of a charge voltage profile of the charge discharge circuit of FIG. 28.
Figure 29B:
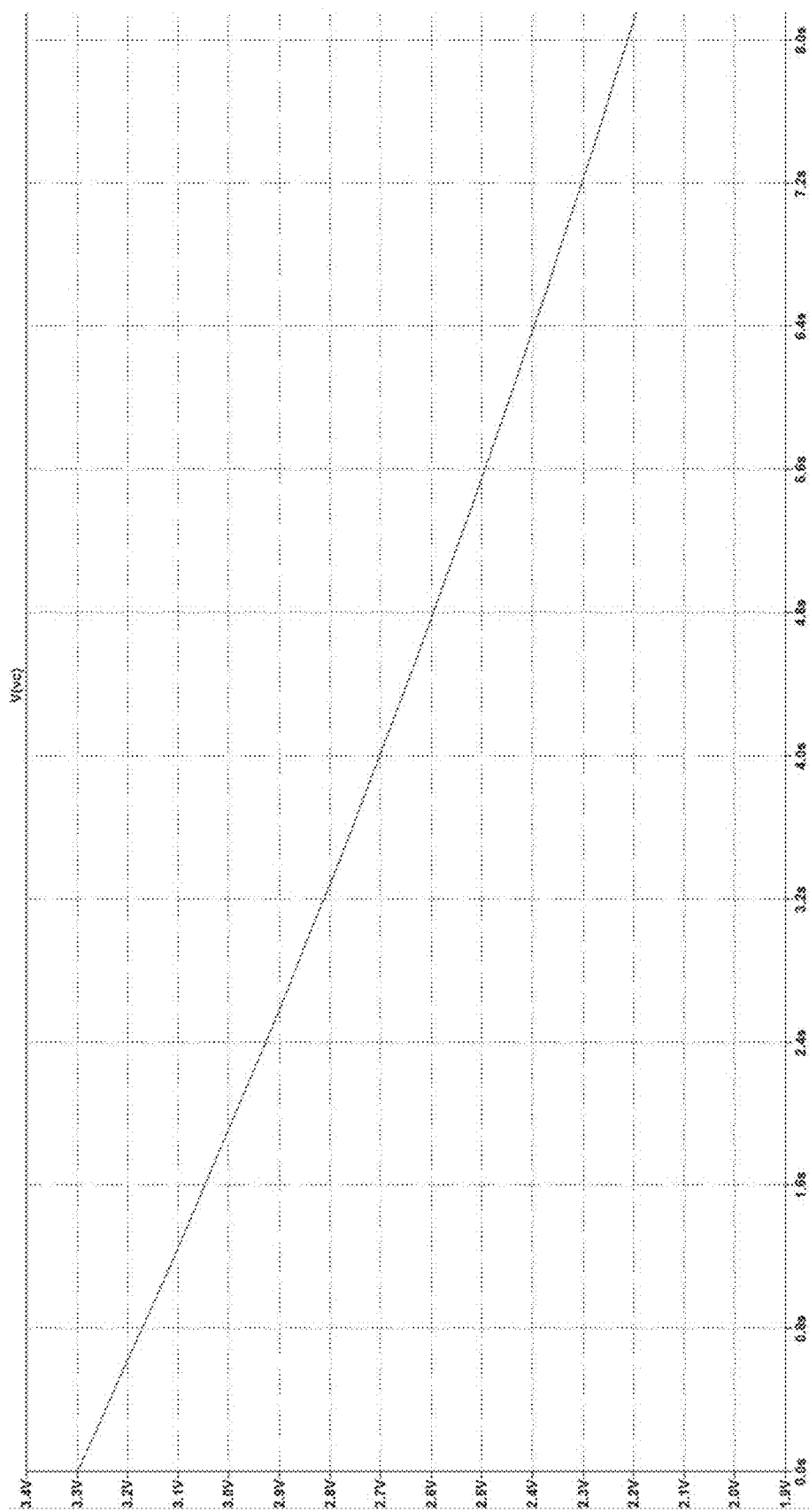
FIG. 29B is a graphical representation of a discharge voltage profile of the charge discharge circuit of FIG. 28.

FIG. 28 depicts one type of hold circuit 266 as a simulation where an input voltage of a brake input signal is approximately 0-3.3 VDC. Here, a switch is used to simulate charging and discharging. In this view, Vc denotes the enable signal to the brake power switch circuit. A charge voltage profile of this simulation is depicted in FIG. 29A, and a discharge voltage profile of this simulation is depicted in FIG. 29B. While the duration of engagement may vary, caregivers will often engage the user input device 232 for around 100 ms. Although 100 ms is considered, other durations of engagement between 0.1 and 0.5 second are acceptable, wherein the engagement period is when the user has engaged the input control. Accordingly, this simulation hold circuit 266 is designed to charge from 0 VCD to 3.3 VDC in 50 ms (see FIG. 29A). This design may be represented by the following equation for an RC Charge circuit: $Vc=Vs(1-e^{(-t/RC)})$ where capacitance C=100 uF, resistance R=50.452, supply voltage Vs=3.3V, and peak capacitor voltage Vc=3.296V. In solving for t, the result is 33.6 ms which may be considered a performance overestimation based on ideals inherent in the equation.

In some versions of the electro-mechanical braking system 64, the motor 120 needs approximately 500 ms to make a complete transition from one state to another. Based on the voltage threshold of 2.3V, and with reference to FIG. 29B, this type of hold circuit 266 simulation can hold the high input value for approximately 7.2 seconds. However, it will be appreciated that this value can be adjusted to accommodate different use scenarios. With these parameters in mind, the following equation for an RC discharge circuit may be employed: $Vc=Vs(e^{(-t/RC)})$ where capacitance C=100 uF, resistance R=50.452, supply voltage Vs=3.3V, and capacitor lower threshold voltage Vc=2.3V. In solving for t, the result is 7.2 sec, which is consistent with the simulation. Although 7.2 seconds is considered, other durations of predetermined periods following user disengagement between 7 and 7.5 seconds are acceptable. Wherein, the predetermined period is more than twice as long as the engagement period of the user.

As the enable signal described above discharges, it enters an indeterminate voltage region where the interpretation of the signal may be addressed by introducing a Schmitt trigger on the output of the enable signal interposed between the hold circuit 266 and the electrical braking assembly 70. Here, the Schmitt trigger outputs the same signal it takes as an input, but without an indeterminate voltage region. As the hold circuit 266 discharges, there is a definite threshold between the Schmitt trigger outputting a high signal and low signal, which results in predictable operation of the hold circuit 266 for the duration of the discharge. Additional circuit protection may be provided in various ways, such as with Zener diodes. Other configurations are contemplated.

Figure 27:
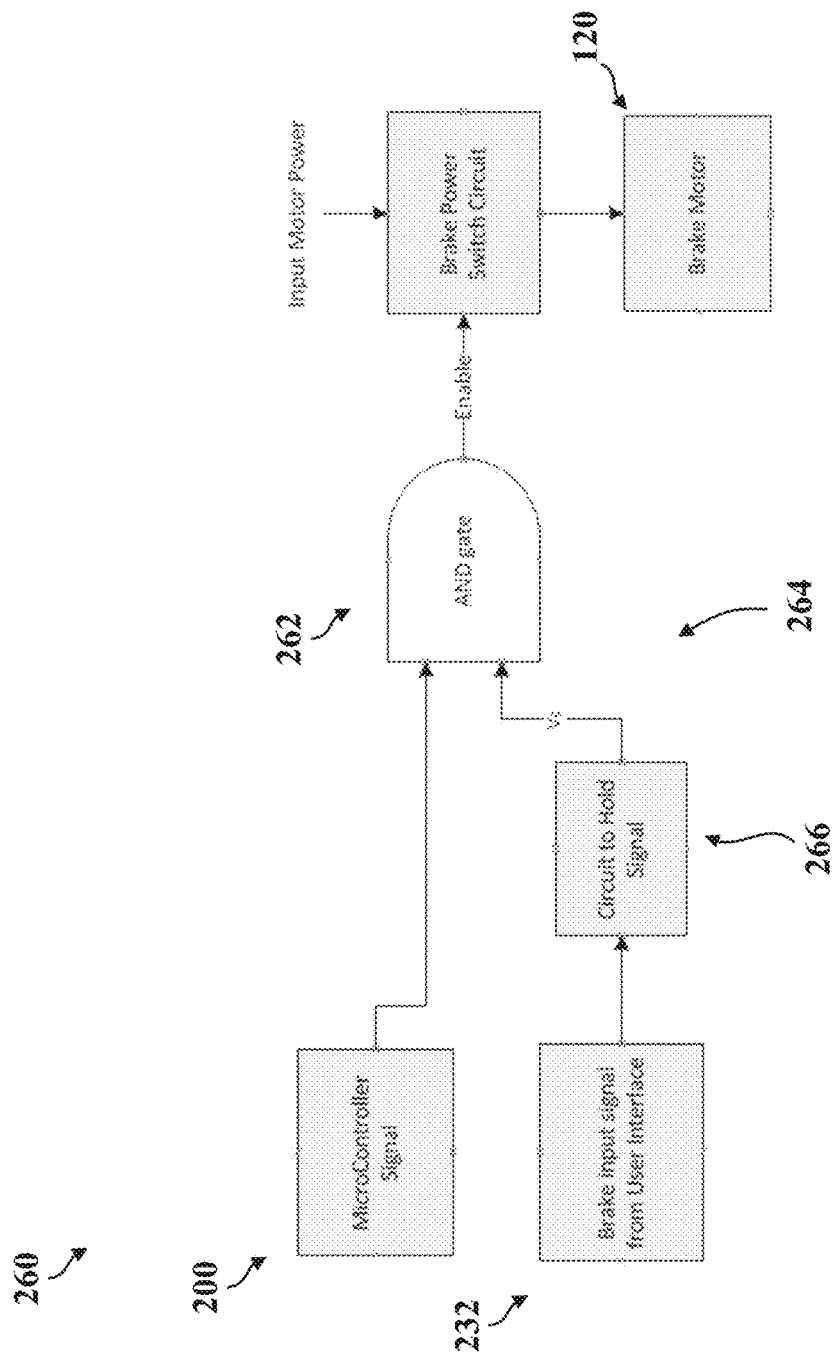
FIG. 27 is a block diagram depicting aspects of a control scheme of the electro-mechanical braking system.
Figure 30A:
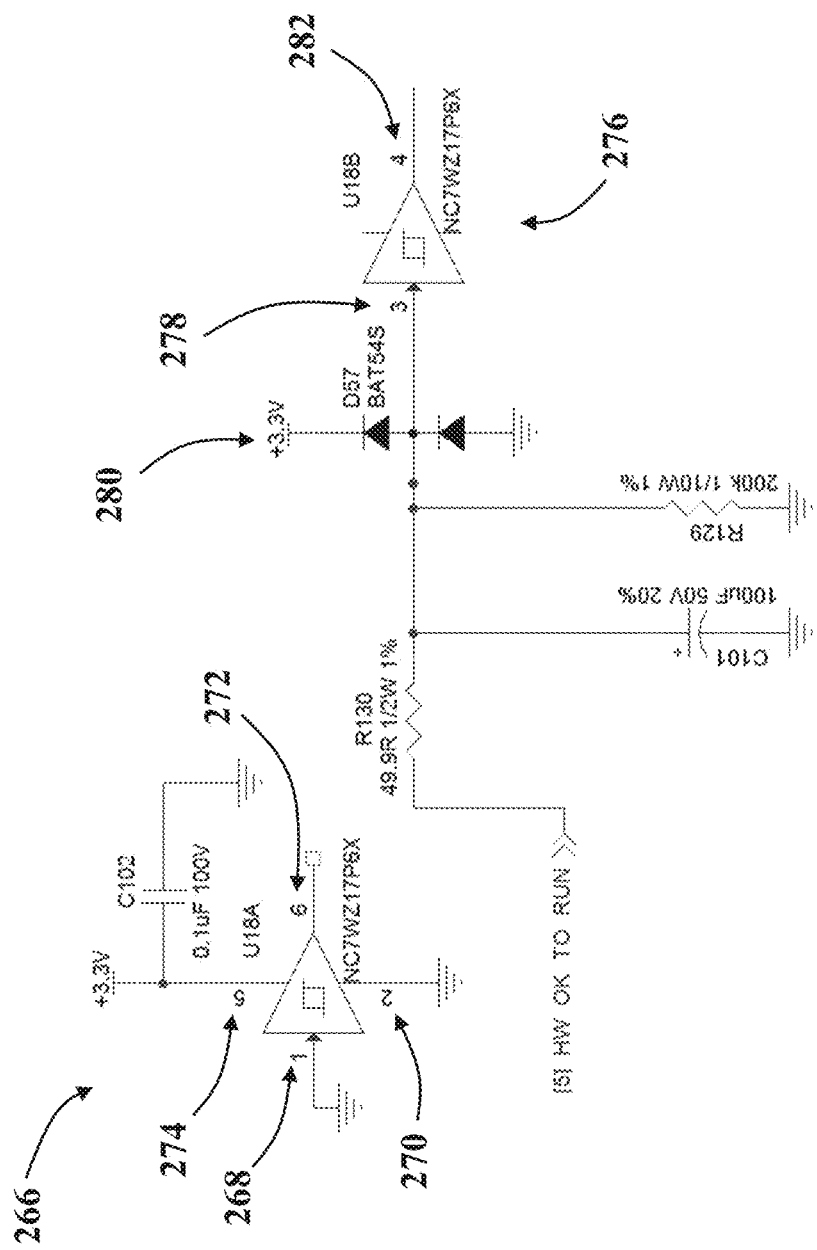
FIG. 30A is a schematic representation of another version of a charge discharge circuit for the control scheme of FIG. 27.
Figure 30B:
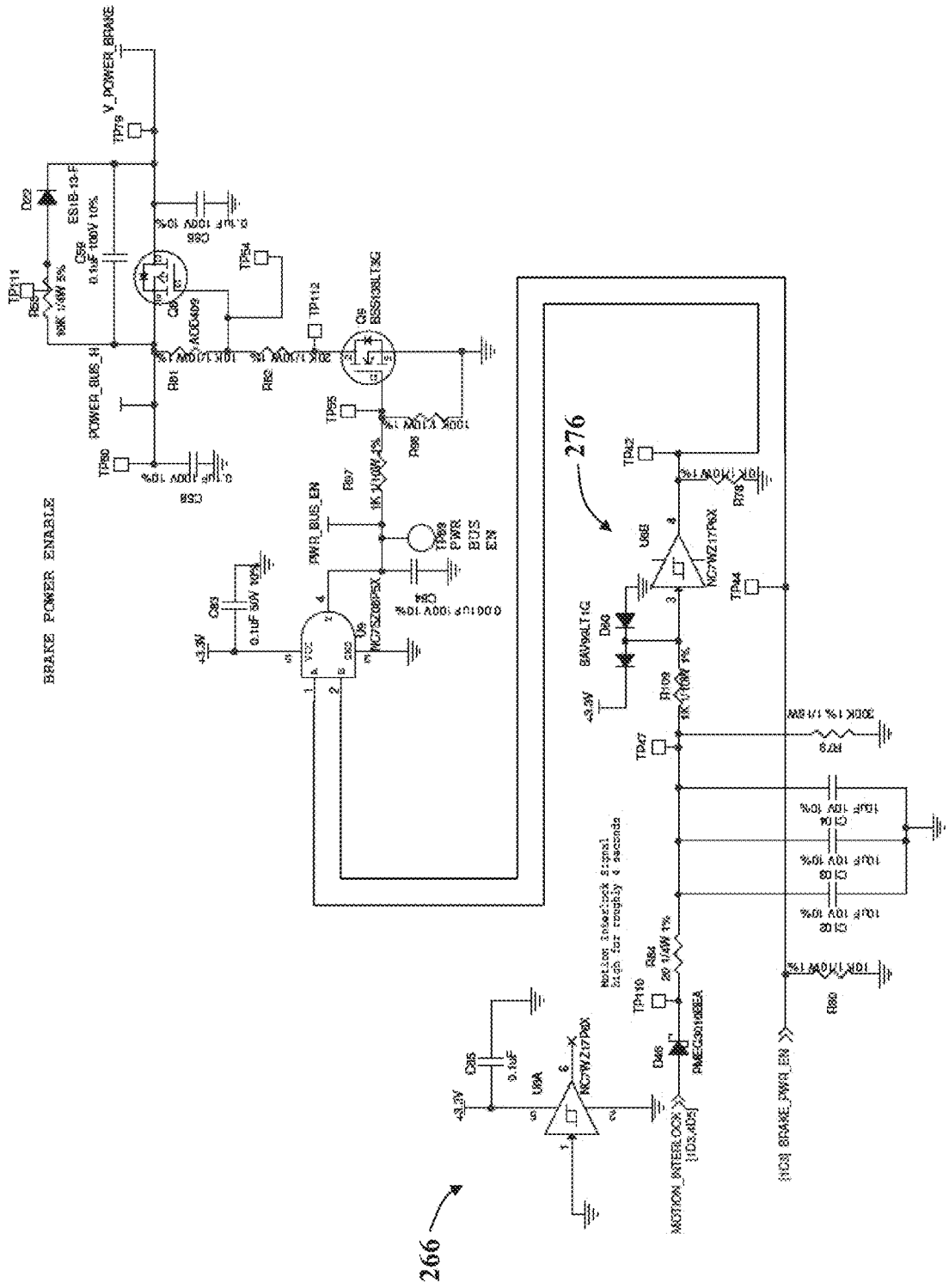
FIG. 30B is another schematic representation of another version of a charge discharge circuit for the control scheme of FIG. 27.

With reference now to FIGS. 30A-30B, schematic representations of versions of a charge discharge circuit for the control scheme of FIG. 27 are shown. In the illustrated version, the hold circuit 266 includes an input 268 and a ground 270. Pin 272 and 282 are outputs. An input supply voltage 274 may be from a standard voltage source. A Schmitt trigger 276, discussed above, is also shown. An input 278 may receive voltage from a battery 280 and/or from the hold circuit 266. Schmitt trigger 276 may include or otherwise define the output 282.

It will be appreciated that the concepts described above in connection with FIGS. 27-30B may be utilized in connection with other momentary buttons and the like utilized to control various features, components, and/or devices of the patient transport apparatus.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:
a support structure comprising a base and a patient support deck;
a caster assembly coupled to the base and comprising a wheel and a braking mechanism to brake the wheel;
a linkage assembly coupled to the braking mechanism and arranged to place the braking mechanism in a braked state in which the braking mechanism brakes the wheel and a released state in which the braking mechanism is released from braking the wheel;
an electrical braking assembly comprising:
a driving member coupled to the linkage assembly; and
an actuator assembly coupled to the driving member and configured to move the driving member to a first position, a second position, and a home position between the first and second positions, and
wherein a first movement of the driving member to the first position causes the linkage assembly to place the braking mechanism in the braked state and a second movement of the driving member to the second position causes the linkage assembly to place the braking mechanism in the released state;
a user interface having an input control arranged for user engagement;
a controller disposed in electrical communication with the electrical braking assembly and the user interface to drive the actuator assembly; and
a brake control circuit interposed between the controller and the user interface to drive the actuator assembly in response to user engagement with the input control, wherein the brake control circuit includes a hold circuit to:
generate an enable signal with a predetermined voltage in response to the user engagement with the input control occurring for an engagement period,
maintain the enable signal for a predetermined period following user disengagement with the input control, the predetermined period being more than twice as long as the engagement period, and
operate the actuator assembly with the enable signal to move the driving member between the first position and the second position within the predetermined period.

2. The patient transport apparatus of claim 1, wherein the user interface comprises a panel operatively attached to the support structure.

3. The patient transport apparatus of claim 2, wherein the input control comprises a momentary button.

4. The patient transport apparatus of claim 1, wherein the user interface comprises a touchscreen operatively attached to the support structure; and
wherein the input control comprises a virtual button presented on a display of the touchscreen.

5. The patient transport apparatus of claim 1, wherein the controller is configured to generate a system status signal representing a powered function condition of the patient transport apparatus.

6. The patient transport apparatus of claim 5, further including an egress detection system disposed in communication with the controller and being operable between an activated mode to determine patient egress from the patient support deck, and a deactivated mode; and
wherein the powered function condition is further defined as operation of the egress detection system in the deactivated mode.

7. The patient transport apparatus of claim 5, further including one or more powered devices disposed in communication with the controller and being operable between an activated mode to perform one or more powered functions of the patient transport apparatus, and a deactivated mode; and
wherein the powered function condition is further defined as operation of the one or more powered devices in the deactivated mode.

8. The patient transport apparatus of claim 5, further including a movement sensing system disposed in communication with the controller and being operable between an activated mode to determine movement of the base of the patient transport apparatus relative to a floor, and a deactivated mode; and
wherein the powered function condition is further defined as operation of the movement sensing system in the deactivated mode.

9. The patient transport apparatus of claim 5, further comprising a redundant circuit interposed between the controller and the electrical braking assembly, wherein the redundant circuit engages the brake control circuit to operate the electrical braking assembly in response to simultaneously receiving:
the enable signal generated from the user engagement with the input control of the user interface via the hold circuit, and
the system status signal generated by the controller.

10. The patient transport apparatus of claim 1, wherein the brake control circuit further comprises a Schmitt trigger interposed between the hold circuit and the electrical braking assembly to stabilize the enable signal at the predetermined voltage for a duration of the predetermined period.

11. The patient transport apparatus of claim 1, wherein the engagement period the input control is engaged by the user is between 0.1 and 0.5 second; and
wherein the predetermined period the enable signal is maintained by the hold circuit is between 7 and 7.5 seconds.

12. The patient transport apparatus of claim 11, wherein the predetermined voltage generated by the hold circuit is 3.3 VDC.

13. A patient transport apparatus comprising:
a support structure comprising a base and a patient support deck;
a caster assembly coupled to the base and comprising a wheel and a braking mechanism to brake the wheel;
a linkage assembly coupled to the braking mechanism and arranged to place the braking mechanism in a braked state in which the braking mechanism brakes the wheel and a released state in which the braking mechanism is released from braking the wheel;
an electrical braking assembly comprising:
a driving member coupled to the linkage assembly; and
an actuator assembly coupled to the driving member and configured to move the driving member to a first position, a second position, and a home position between the first and second positions, and
wherein a first movement of the driving member to the first position causes the linkage assembly to place the braking mechanism in the braked state and a second movement of the driving member to the second position causes the linkage assembly to place the braking mechanism in the released state;
a user interface having an input control arranged for user engagement;
a controller disposed in electrical communication with the electrical braking assembly and the user interface to drive the actuator assembly, wherein the controller is configured to generate a system status signal representing a powered function condition of the patient transport apparatus;
a brake control circuit interposed between the controller and the user interface to drive the actuator assembly in response to user engagement with the input control, wherein the brake control circuit includes a hold circuit to:
generate an enable signal with a predetermined voltage in response to the user engagement with the input control,
maintain the enable signal for a predetermined period following user disengagement with the input control, and
operate the actuator assembly with the enable signal to move the driving member between the first position and the second position within the predetermined period; and
a redundant circuit interposed between the controller and the electrical braking assembly, wherein the redundant circuit engages the brake control circuit to operate the electrical braking assembly in response to simultaneously receiving:
the enable signal generated from the user engagement with the input control of the user interface via the hold circuit, and
the system status signal generated by the controller.

14. The patient transport apparatus of claim 13, wherein:
the user interface comprises a panel, and
the input control comprises a momentary button.

15. The patient transport apparatus of claim 13, wherein:
the user interface comprises a touchscreen, and
the input control comprises a virtual button presented on a display of the touchscreen.

16. The patient transport apparatus of claim 13, further including an egress detection system disposed in communication with the controller and being operable between an activated mode to determine patient egress from the patient support deck, and a deactivated mode; and
wherein the powered function condition is further defined as operation of the egress detection system in the deactivated mode.

17. The patient transport apparatus of claim 16, further including one or more powered devices disposed in communication with the controller and being operable between operable between an activated mode to perform one or more powered functions of the patient transport apparatus, and a deactivated mode, wherein the one or more powered devices includes one or more actuators to adjust the patient support deck relative to the base; and wherein the powered function condition is further defined as operation of the one or more powered devices in the deactivated mode.

18. The patient transport apparatus of claim 13, further including a movement sensing system disposed in communication with the controller and being operable between an activated mode to determine movement of the base of the patient transport apparatus relative to a floor, and a deactivated mode; and wherein the powered function condition is further defined as operation of the movement sensing system in the deactivated mode.

19. The patient transport apparatus of claim 13, wherein the brake control circuit further comprises a Schmitt trigger interposed between the hold circuit and the electrical braking assembly to stabilize the enable signal at the predetermined voltage for a duration of the predetermined period.

20. A patient transport apparatus comprising: a support structure comprising a base and a patient support deck; a caster assembly coupled to the base and comprising a wheel and a braking mechanism to brake the wheel; a linkage assembly coupled to the braking mechanism and arranged to place the braking mechanism in a braked state in which the braking mechanism brakes the wheel and a released state in which the braking mechanism is released from braking the wheel; an electrical braking assembly comprising: a driving member coupled to the linkage assembly; and an actuator assembly coupled to the driving member and configured to move the driving member to a first position, a second position, and a home position between the first and second positions, and wherein a first movement of the driving member to the first position causes the linkage assembly to place the braking mechanism in the braked state and a second movement of the driving member to the second position causes the linkage assembly to place the braking mechanism in the released state; a user interface having an input control arranged for user engagement; a controller disposed in electrical communication with the electrical braking assembly and the user interface to drive the actuator assembly; and a brake control circuit interposed between the controller and the user interface to drive the actuator assembly in response to user engagement with the input control, wherein the brake control circuit includes a hold circuit to: generate an enable signal with a predetermined voltage in response to the user engagement with the input control, maintain the enable signal for a predetermined period following user disengagement with the input control, and operate the actuator assembly with the enable signal to move the driving member between the first position and the second position within the predetermined period; and wherein the brake control circuit further comprises a Schmitt trigger interposed between the hold circuit and the electrical braking assembly to stabilize the enable signal at the predetermined voltage for a duration of the predetermined period.

* * * * *